United States Patent [19]
Kitamura et al.

[11] Patent Number: 5,717,214
[45] Date of Patent: Feb. 10, 1998

[54] X-RAY BEAM POSITION MONITOR AND ITS POSITION MEASUREMENT METHOD

[75] Inventors: Hideo Kitamura, Himeji; Yoshiyuki Yamamoto; Keiichiro Tanabe, both of Itami; Hisaharu Sakae, Aioi, all of Japan

[73] Assignee: Rikagaku Kenkyusho, Wako, Japan

[21] Appl. No.: 628,842

[22] Filed: Apr. 5, 1996

[30] Foreign Application Priority Data

Apr. 7, 1995 [JP] Japan .................... 7-082880
Apr. 26, 1995 [JP] Japan .................... 7-101868

[51] Int. Cl.⁶ ........................... G01T 1/29
[52] U.S. Cl. ........................ 250/370.1; 250/336.1
[58] Field of Search ................ 250/370.1, 336.1; 375/145; 324/71.3

[56] References Cited

U.S. PATENT DOCUMENTS 3,612,858  10/1971  Parry .
5,079,425   1/1992  Imai et al. .
5,387,795   2/1995  Kuzay et al. .
5,404,014   4/1995  Shu et al. .

FOREIGN PATENT DOCUMENTS

A-676425  7/1952  United Kingdom .

*Primary Examiner*—David P. Porta
*Assistant Examiner*—Richard Hanig
*Attorney, Agent, or Firm*—Griffin, Butler, Whisenhunt & Kurtossy

[57] ABSTRACT

The present invention provides a X-ray beam position monitor, including a diamond plate placed so that the X-ray beam pass through diamond plate, and a plurality of electrode pairs placed on both sides of the diamond plate. The monitor makes it possible to monitor position of high power X-ray beam with high accuracy and at high speed. In addition, the monitor can be stably operated and reduce costs for manufacturing itself.

18 Claims, 13 Drawing Sheets

X-ray beam

X-ray beam

X-ray beam

X-ray beam

X-RAY BEAM POSITION MONITOR AND ITS POSITION MEASUREMENT METHOD

BACKGROUND OF THE INVENTION

1. FIELD OF THE INVENTION

The invention relates to an apparatus for monitoring position of X-ray beam such as synchrotron radiation and also to a method of monitoring position of X-ray beam.

2. DESCRIPTION OF THE RELATED ART

A synchrotron radiation is defined as an electromagnetic wave radiated in a direction tangent to an orbit of an electron having been accelerated by an electron accelerator. The synchrotron radiation has continuous ranges of wavelength and an electric vector polarized in an orbital plane, and has quite great intensity. The synchrotron radiation can be used for spectroscopy and diffraction experiments in the range of visible light to hard X-rays due to the continuous ranges of wavelength. For carrying out such experiments, the X-ray beam position monitors are necessary in order to measure and stabilize X-ray beams.

Synchrotron radiation was discovered in 1940s based on the fact that electrons moving at nearly light speed in a circular accelerator tangentially emit intensive electromagnetic waves. Such synchrotron radiation can be generated by the synchrotron radiation facility schematically illustrated in FIG. 1.

The illustrated synchrotron radiation facility comprises an electron gun 1, a linear accelerator 2, a synchrotron 3, an accumulation ring 4, beam lines 5, and experimental apparatus 6 associated with the beam lines 5. Electrons 7 emitted from the electron gun 1 are accelerated through the linear accelerator 2, for instance, to 1 GeV, and injected into the synchrotron 3. The electrons 7 are further accelerated in the synchrotron 3 by RF cavities to 8 GeV, and injected into the accumulation ring 4 acting as a circular accelerator. The electrons 7 circulate at a high speed in the accumulation ring 4 with keeping the constant high energy (8 GeV). When electrons pass through bending magnet or insertion devices, a beam 8 is emitted. These X-ray beams 8 are transported to the experimental apparatus 6 through the beam lines 5. The accumulation ring or circular accelerator 4 is a large-sized facility having a circumference of about 1500 m, and each of the beam lines 5 may have a length ranging from 50 m to 1000 m, in dependence on a use of the X-ray beam 8.

The synchrotron radiation as mentioned above is a highly collimated brilliant light having a wide wavelength range from infrared to hard X-rays. The synchrotron radiation has been called "a dream light" among scientists, and can be utilized in various fields as follows: (a) research for structure and characteristics of material such as arrangement of atoms in a crystal and structure of superconducting material, (b) research for structure and functions of dynamics such as growth process of a crystal and chemical reaction process, (c) research for life science and biotechnology, (d) development of new material including detection of lattice defects and impurities, and (e) medical applications such as diagnosis of cancer.

The above mentioned synchrotron radiation is a quite brilliant light ranging from vacuum ultraviolet (VUV) having a wavelength equal to or less than 2000 angstroms to X-rays having a wavelength of about one angstrom, which region is quite difficult to be obtained by other light sources. The synchrotron radiation provides advantages as follows.

A. If electron energy is sufficiently high, the radiation beam exhibits a continuous strength profile in a wide range of wavelength ranging from X-ray to far infrared (FIR).

B. Due to relativistic effects, the radiation beam is highly collimated in a direction in which electron beams run, and hence can have practically high beam intensity.

C. The radiation beam has remarkable linear polarization, and its oscillation plane is in parallel with an orbital plane of electron beams. However, elliptic polarization is caused if the X-ray beam is emitted at an angle with the orbital plane of electron beams.

However, as the synchrotron radiation has been used and researched, it was found that it has shortcomings as follows.

A. Since the light intensity of the radiation beam ranges in quite broad wavelength range, it is unavoidable for monochromatized light to contain not insignificant amounts of higher order and stray light. Furthermore, an optical device is worn out by light in the non-used wavelength range.

B. The collimation of the X-ray beam is better than an X-ray tube having three-dimensional directivity, but not so sharp as a laser having one-dimensional directivity.

Thus, as illustrated in FIGS. 2A and B, insertion devices called respectively an undulator and a wiggler have been researched and developed. These insertion device are located in linear portions of the accumulation ring or circular accelerator between bending magnets to generate high brilliant photon beams with constant energy. Such insertion devices have been reported in many articles, for instance, "View about Light Source for Synchrotron Radiation Users", Proceeding of the 2nd school of the Japanese society for synchrotron radiation research, 1989, and "Technology of High brilliant synchrotron radiation", Buturi published by the Physical Society of Japan, Vol. 44, No. 8, 1989.

Until now, the following photon beam position monitors have been suggested: (a) a monitor using fluorescent images appearing on a fluorescent screen; (b) a chopper type monitor; (c) a split ionization chamber; (d) a monitor utilizing fluorescent X-rays; and (e) a monitor utilizing photoelectron emission. The above mentioned monitors (a) to (e) have problems that they remarkably interrupt beams, and that it is not possible for them to be installed in beam lines in high vacuum condition. Thus, they can be used in beam lines in only specific conditions.

The above mentioned monitor (a) receives a part of photon beams on a fluorescent screen, and the monitors position of the photon beams by analyzing the resultant fluorescence image with a television camera. However, the position sensitivity is restricted by the grain size of the fluorescent material, the magnification power of the lens of the television camera, and the number of CCD pixels of the television camera, and thus, it is difficult to have position-resolution smaller than 50 µm.

The above mentioned monitor (b) monitors the position of photon beams by oscillating at high speed in the photon beam a reed on which certain fluorescent material is coated.

The above mentioned chamber (c) has an anode plate and a cathode of two right angled triangular plates. When photon beams pass between a cathode and an anode of the chamber, ions produced in the chamber are collected on the cathode divided into upper and lower portions. If the photon beams move, there is produced a difference between ion currents flowing into the two portions of the cathode. The position of the photon beams can be measured from such a difference. A few hundreds of volts are applied between electrodes. The shortcoming of this monitor is that it is quite sensitive to a flow rate of gas (normally, He gas) flowing through the chamber.

Since the beams lines for photon beams need to be in a high vacuum condition similarly to the acceleration ring, the photon beam position monitor must be high vacuum compatible. The monitor can not be installed in the high vacuum position of beam lines because it makes use of gas.

In the above mentioned monitor (d), a target made of tantalum (Ta) is installed in beam lines, and secondary fluorescent X-rays emitted from the target are observed by a scintillation counter to monitor the position of photon beams. However, it has the problem that it significantly interrupts photon beams.

The above mentioned monitor (e) has many advantages such that it can be directly installed in beam lines in high vacuum condition, it has sensitivity in a wide range of wavelength ranging from the VUV region to the X-ray region, and it has superior stability, position-resolution and dynamic ranges. Hence, various types of the monitor have been developed, and have been widely used. The quantum efficiency of photo-electron emission at a surface of a metal is not so large, and is on the order of a few percent. The metal with high melting point such as tungsten (W) or molybdenum (Mo) is used as an electrode on which the photon beams radiate.

For insertion devices in beam lines above mentioned monitor (e), which has blade-type electrodes, is generally used. Thus, the monitor is likely to be influenced by background caused by the radiation emitted from the bending magnets. In addition, the monitor has the problem that shade caused by a blade of a monitor placed upstream tends to exert an influence on a monitor placed downstream.

It is proposed that a semiconductor detector be applied as an X-ray beam position monitor.

As a semiconductor Si or G is often used, in which a reverse voltage is applied across a p-n junction. When X-ray beams are injected into the p-n junction, electron-hole pairs are created and it generates current.

However, such a semiconductor detector has a smaller response speed then an X-ray beam position monitor due to small saturated velocity of carriers (Si has a saturated electron velocity of $1 \times 10^7$ cm/s), because of the electric property of Si or Ge. Even intrinsic Si having high purity has resistivity of about $10^5$ $\Omega$.cm, and Ge has lower resistivity. If an electrode is attached to an intrinsic Si or Ge semiconductor and a voltage is applied across the electrode, there is produced excessive dark current. Thus, a p-n junction is used for the suppression of the dark current, and a reverse biased voltage is applied to it.

On the other hand, if single crystal diamond is used as for a detector, it is possible to obtain quick response and high sensitivity. For instance, such a monitor has been suggested in Japanese Unexamined Patent Publication No. 62-198780 and European Patent No. 52397. This is because carriers in single crystal diamond have high saturation electron velocity, specifically, $2.5 \times 10^7$ cm/s.

When a diamond is to be used as a detector, a voltage is applied to an intrinsic region which acts as an active element. Therefore, p-n junction is not necessary. This is because a diamond has sufficiently high resistivity in an intrinsic region, and hence it is possible to suppress the decreased dark current.

When X-ray beams radiated perpendicularly to a plane of the semiconductor of Si or Ge, electron-hole pairs are generated only in a depletion layer of the p-n junction. Therefore it reduces the sensitivity. On the other hand, in a diamond having no p-n junctions, electron-hole pairs can be generated in the whole region through which X-ray beams have passed. Thus, the latter type detector can have higher sensitivity, but single crystal diamond having a small number of crystal defects should be used. However, it is not easy to obtain or to fabricate such single crystal diamond with few defects.

These days, there has been developed a process for synthesizing film-like polycrystal diamond out of vapor phase at low cost. An attempt has been made in vain to fabricate a radiation detector including polycrystal diamond having been made in accordance with the process. The reason is that the thus-made polycrystal diamond does not have requisite quality, and has quite low sensitivity to radiation beams.

To resolve these problems, Japanese Unexamined Patent Publication No. 4-145668 has suggested a radiation detector using polycrystal diamond and operating at high speed. The main cause for lowered sensitivity of polycrystal diamond of detecting radiation beams is grain boundary present among crystal grains. Thus, a column-shaped polycrystal diamond is used in which a grain boundary does not exist in the growth direction or voltage application direction in a region at which a voltage is applied to a diamond, to thereby obtain a radiation detector operating at high speed, having high sensitivity and being fabricated at low cost. As a process for not allowing grain boundary to exist in growth direction or voltage application direction have been proposed two processes: (1) to remove a surface on a growth plate and an interface between a diamond plate and a substrate, in which much of the grain boundary and the crystal defects exist, to thereby cause electric field not to be applied to a portion including much of grain boundary and crystal defects; and (2) to form an electrically conductive layer on a surface of a growth plate and in an interface between a diamond plane and a substrate to thereby cause electric field not to be applied to a portion including much of grain boundary and crystal defects.

It is now possible to generate more brilliant X-ray beams than before by means of the above mentioned insertion devices such as an undulator and a wiggler. However, although it is inevitably necessary to detect the position of X-ray beams with accuracy in various experiments utilizing X-ray beams, it has become difficult to use a conventional X-ray beam position monitor position due to the great intensity of X-ray beams.

An X-ray beam position monitor to be used for a beam line of an insertion device is required to have functions as follows: (a) high position resolution on the order of sub microns to a few microns within a wide monitoring range; (b) high heat-resistance; (c) quick response and possibility of feed-back control (greater than 10 Hz) of a light source and an optical system; (d) having no effect by back ground radiation coming from bending magnets and scattering beams; (e) capability of monitoring X-ray radiation beams even in experiments without interrupting X-ray beams; (f) easiness of maintenance and capability of stable operation in long term; (g) reasonable cost; and (h) capability of obtaining the information about X-ray beams such as profile, intensity and energy as well as position of X-ray beams.

In particular, the X-ray beam position monitor that is used in a recent synchrotron radiation generating high brilliant X-ray beams is required to have the above functions (a) to (d). A currently available X-ray beam position monitor to be used for an insertion device beamline can be divided into the following four groups in terms of a structure: (a) ionization chamber type; (b) wire type; (c) area type; and (d) blade type, each of which is illustrated in FIGS. 3A to 3D, respectively.

The ion chamber type monitor illustrated in FIG. 3A detects a ionization current of the gas contained in the ion chamber produced when X-ray beams pass through it. The position of the X-ray beam can be measured by the currents from divided cathode. This apparatus is superior in position-resolution and working range, but has the shortcoming that it cannot be used in a ultra-high vacuum portion in a beam line because of the use of gas.

The wire type monitor illustrated in FIG. 3B utilizes photoelectron effect to occur on impingement of X-ray beams to a wire made of metal. This monitor includes fixed type and scan type. In the fixed type, two wires are fixed on opposite sides of the X-ray beams, and a difference in signal intensity is detected to thereby monitor the beam position. In the scan type, a wire is scanned across the X-ray beams, and then beam profile is monitored. This monitor is superior in position-resolution, response time, maintenance and costs, but has a problem that the monitoring takes a relatively long time, and hence a quick feed-back control is difficult in the case of the scan type monitor. On the other hand, the fixed type provides quick response, but has problems with respect to heat-resistance and crosstalk between wires.

The area type monitor illustrated in FIG. 3C utilizes photoelectron effect to occur on impingement of X-ray beams to an electrode made of metal. This monitor includes split electrodes placed perpendicularly to radiation beams, and monitors X-ray beam position in accordance with a difference in signal intensity in the electrode. This monitor is superior in position-resolution, working range, response time, maintenance and costs, but has the problem of heat-resistance because the beam passes through the electrodes.

The blade type monitor illustrated in FIG. 3D utilizes photoelectron effect to occur on impingement of X-ray beams to a blade made of metal. This monitor includes a pair of blades on upper and lower sides or on left and right sides of the beam, and monitors beam position in accordance with a signal ratio of the blades. This monitor is superior in position-resolution and response time, and thus is recently often used as an X-ray beam position monitor. However, it has the problem that it is likely to be influenced by background of bending magnets and by the variation of beam profile.

Any of the above mentioned monitors has the problem of heat-resistance when used for a recent synchrotron radiation facility which generates high power X-ray beams, and hence, it becomes difficult to use ordinary metals. Thus, it is presently required to use material which absorbs smaller quantity of heat of X-rays and is superior in heat-resistance and conductivity. In addition, as mentioned earlier, an error in monitoring caused by background of bending magnets is now a serious problem, and hence it is also necessary to solve it.

Thus, a X-ray beam position monitor to be used for an insertion device beam line is required to have the following characteristics:

(a) it can provide high position-resolution on the order of sub-microns;

(b) it is possible to place the monitor in a high vacuum;

(c) it has high heat-conductivity, and also has high heat-resistance;

(d) it has quick response; and (e) it has radiation-resistance, and can stably operate in the long term.

In a conventionally used X-ray beam position monitor which utilizes photoelectron effect, the metal blades are also exposed to X-ray beams, and hence temperature of the blades rises remarkably. Thus, refractory metal is used as blades, and water cooling on sidewalls of the blade in order to prevent it from being damaged and increase heat transfer. However, as the beam power increases a conventional monitor using metal blades becomes unable to thermally withstand.

SUMMARY OF THE INVENTION

The invention has been made to resolve the above mentioned problems. It is an object of the present invention to provide the X-ray beam position monitor, capable of: (a) providing high accuracy for monitoring position of X-ray beams; (b) withstanding high-powered X-ray beams for a long time, namely, having radiation-resistance and heat resistance; (c) providing quick response; (d) being unlikely to be influenced by background of bending magnets; (e) having less radiation beam loss and scattering, namely, having high transmission, and thereby monitoring the beam position while the using beam for experiments (on-line monitoring); (f) being easy in maintenance and stably operating in the long term; (g) being relatively readily manufactured at low cost; and (h) being directly installed in high vacuum.

Namely, it is an object of the present invention to provide such a monitor capable of having the required characteristics, monitoring high-powered X-ray beams with high accuracy at high speed, stably operating, and decreasing manufacturing costs.

In one aspect, the present invention provides an X-ray beam position monitor, comprising a diamond plate placed so that X-ray beam passes through the diamond plate, and a plurality of electrode pairs placed on opposite sides of the diamond plate.

The monitor further includes a DC current source for applying a voltage to the electrode pairs, and a current measuring apparatus for measuring a current flow through the diamond.

In a preferred embodiment, the electrode pairs are formed symmetrically with one another about an intersection of the radiation beam with the diamond plate.

In still another preferred embodiment, the monitors further includes an arithmetic processing circuit which gives a beam position.

In yet another preferred embodiment, the monitor further includes a cooling mechanism for the diamond plate.

In a further preferred embodiment, the monitor further includes a feed-back system for feed-back control of a beam position on the basis of a measured beam position.

In another preferred embodiment, the diamond plate is composed of a single plate.

In a still further preferred embodiment, the diamond plate is composed of a plurality of flat plates.

In yet another preferred embodiment, the diamond plate is fabricated by vapor phase synthesis.

In another preferred embodiment, the diamond plate is composed of single crystal diamond or polycrystal diamond.

In a further preferred embodiment, the diamond plate has resistivity equal to or greater than $10^7$ $\Omega$.cm.

In a still further preferred embodiment, the diamond plate is formed with a hole or a thinner thickness portion at its center.

In yet another preferred embodiment, the diamond plate has a diamond layer having lower resistivity.

In another preferred embodiment, the diamond layer has resistivity ranging from $10^{-3}$ to $10^2$ $\Omega$.cm.

In a further preferred embodiment, the diamond layer is a layer into which boron (B) is doped.

In another preferred embodiment, the diamond layer is a layer into which boron (B) is doped at a dose of $10^{16}/cm^3$.

The present invention further provides a X-ray beam position monitor, including a diamond plate and a plurality of probes made of a metal film formed on the diamond plate, the monitor being placed perpendicularly to the radiation beam.

In another preferred embodiment, the diamond plate is made by vapor phase synthesis.

In still another preferred embodiment, the diamond is a polycrystal diamond made by vapor phase synthesis.

In yet another preferred embodiment, the diamond plate is formed with a hole or a thinner thickness portion in the center of it In still yet another preferred embodiment, the probe is composed of metal selected from aluminum (Al), or copper (Cu) or beryllium (Be), The invention further provides a X-ray beam position monitors including a diamond plate to be placed perpendicularly to X-ray beams, and a plurality of metal film probes formed at least at either side of the diamond plate and collecting electrodes. There may be provided a single or a plurality of collectors.

In another aspect, the present invention provides a method of monitoring beam position, including the steps of (a) placing a diamond plate with a plurality of electrode pairs on opposite sides of the diamond plate so that X-ray beams pass through the diamond plate, (b) applying a voltage between the electrode pairs, (c) measuring a current flowing through the electrode pairs, and (d) monitoring position of the X-ray beam based on the current.

A first example of using diamond as a radiation detector can be found in G. Stretter's case in 1941. However, since diamond was quite expensive at that time, a radiation beam detector using diamond was not generally used. These days, technology for synthesizing artificial diamond by using CVD and so on has been developed, and hence diamond having superior characteristics is available at low price. Thus, there is now the possibility of putting a radiation detector including diamond to practical use similarly to a conventional semiconductor detector using Ge or Si.

In a semiconductor detector using Ge or Si, a reverse biased voltage is applied across a p-n junction. Then, radiation beam can be measured by detecting a current caused by electron-hole pairs to be generated in the p-n junction. On the other hand, diamond has high resistance at room temperature and hence exhibits insulator characteristics. However, ultraviolet light having short wavelength or high energy radiation beam produces electron-hole pairs in diamond similarly to Ge or Si, and thus it is possible to detect a radiation beam. In addition, since diamond has higher resistivity, it is not necessary to suppress dark current by means of p-n junction as in Ge and Si. What is necessary to do is to form electrodes at opposite sides of diamond and apply bias voltage between them.

Diamond has many characteristics required for a conventional radiation detector such as that (a) it has large mobility of carriers, and quick response, and that (b) it has small capacitance per unit area, and a high S/N ratio. In addition, diamond has additional characteristics such as that (a) it has superior thermal and mechanical characteristics such as heat-resistance and high thermal conductivity, (b) it has about 100 times larger radiation-resistance than silicon, and (c) it absorbs smaller amount of light due to its smaller atomic number, resulting in that diamond can be used in harsh conditions such as high temperature and high radiation level.

A recent application example of diamond to a radiation detector is found in a carolimeter for detecting energy of gamma rays and high energy electrons in high energy physics experiments (for instance, see "Development of diamond radiation detectors for SSC and LHC", M. Franklin et al., NIM A315, 1992). As an experimental example in which output power of synchrotron radiation was measured, there was reported in "Absolute X-ray power measurements with subnanosecond time resolution using type IIa diamond photoconductors", D. R. Kania et al., J. Appl. Phys., 68(1), 1990. The inventors pay attention to the above mentioned electric characteristics, heat-resistance and radiation-resistance of diamond as a photoconductor, and provides a X-ray beam position monitors to be installed in beam lines in harsh conditions such as high radiation level and high temperature. In the present invention, by using technology for forming electrodes to be used for a semiconductor as well as the above mentioned characteristics of diamond, there is provided an X-ray beam position monitor in which accurately divided electrodes are formed on a surface of diamond for monitoring beam position.

The present invention is based on the above mentioned novel concept and discovery, and was made to accomplish the above mentioned novel objects.

The monitor made in accordance with the present invention includes a diamond plate placed so that an X-ray beam pass through the diamond plate, and a plurality of electrode pairs placed on both sides of the diamond plate. Thus, it is possible to measure the X-ray of radiation beams passing through the electrode pairs by detecting current signals through electrode pairs, which signals are caused by free carriers such as electrons and holes to be generated when the X-ray beams pass through the diamond plate. The monitor may further include a DC current source for applying a voltage to the electrode pairs, and a current measuring apparatus for measuring a current flowing between electrode pairs. Thus, it is possible to detect an intensity of X-ray beams passing through the electrode pairs on the basis of the intensity of a current flowing between the electrode pairs. As mentioned later, since X-ray beams symmetrically extend about a center thereof, it is also possible to find a center of X-ray beams by calculating a center of gravity of the X-ray beams based on intensity of X-ray beams passing through electrode pairs.

The above mentioned X-ray beam position monitor is capable of (a) placing a diamond plate having electrode pairs in a high degree vacuum, (b) withstanding high-powered X-ray beams long term, namely, having radiation-resistance and heat resistance because of diamond characteristics; (c) providing quick response; (d) having less radiation beam loss and scattering by using a thin diamond film having high transmission of X-ray beam; (e) monitoring position of X-ray beams while using beam for experiments (on-line monitoring), (f) providing high accuracy in monitoring beam position by forming electrodes with high accuracy, (g) avoiding to be influenced by back ground from bending magnets radiated at circumference of the diamond plate by arranging the electrodes near the center of the diamond plate, since only a region in which the electrodes are formed has sensitivity, and (h) using thin-film diamond which has recently been developed, making it possible to fabricate the monitor with ease at low cost.

In the monitor, the electrode pairs may be formed symmetrically with one another about an intersection of the X-ray beam with the diamond plate, thereby it becomes easier to measure a center of the X-ray beams.

The monitor may further include a cooling mechanism for the diamond plate, thereby avoiding overheating of the diamond plate. The monitor may further include a feed-back system for carrying out feed-back control of the beam position on the basis of a measured beam position, thereby making it possible to keep the position of radiation beams stable.

That is, the inventors have paid attention to diamond which has large thermal conductivity among materials and also has relatively high radiation-resistance, and have applied the use of diamond to the X-ray beam position monitor.

Diamond has the following advantages as an X-ray beam position monitor in comparison with conventional materials:

(a) diamond has at least 100 times greater radiation-resistance than silicon (Si);

(b) diamond exhibits superior electric and mechanical characteristics even in high temperature conditions at hundreds of degrees;

(c) diamond has large velocity of carriers (electrons and holes) of about $2.5 \times 10^7$ cm/s, which provides first rise time below 1 ns;

(d) diamond has dielectric constant which is about half of that of Si, and hence smaller capacitance per unit area, resulting in lower noise and higher S/N ratio; and (e) diamond has relatively large band-gap, specifically, 5.5 eV, and thus does not need a p-n junction, thereby allowing the monitor to be able to have a simple structure.

The inventors have fabricated studied and researched the monitor according to the invention on an experimental basis in various types by using diamond having the above mentioned advantages. As a result, the inventors have made an X-ray beam position monitor which can be fabricated at low cost and can stably operate at high speed.

Hereinbelow is explained the present invention in detail.

A diamond plate to be used for the present invention needs to be shaped in accordance with a shape of a beam line into which the monitor is installed. When a circular diamond plate is used, it is required to prepare plate type diamond having a diameter equal to or greater than 10 mm. Hence, it is difficult to fabricate artificially synthesized diamond made under high temperature and high pressure and natural diamond with required size. Even if obtained, such diamond would be quite expensive. On the other hand, diamond synthesized in accordance with vapor phase synthesis has an advantage that diamond with larger surface area can be fabricated at low cost.

The diamond plate may be composed of single crystal diamond or polycrystal diamond. In view of costs, polycrystal diamond can be fabricated at lower cost. Both of single crystal and polycrystal diamond may be used in combination.

As mentioned earlier, since the diamond plate used for the present invention needs to be shaped in accordance with a shape of X-ray beams, the diamond plate ordinarily has diameter of 10 mm or greater, and has a thickness of preferably 10 µm or greater, more preferably 50 µm or greater. If the diamond plate is too thick, it would be expensive. Hence, the diamond plate has a thickness preferably smaller than 1 mm in view of costs. The preferable thickness of the diamond plate is in the range of 50 µm to 400 µm When polycrystal diamond plate is used, there may arise a problem of deterioration of monitoring ability in grain boundary. This problem can be solved by the process suggested in the above mentioned Japanese Unexamined Patent Publication No. 4-145668. That is, polycrystal diamond includes much of the grain boundary in the vicinity of a growth substrate and growth surfaces which interface with the substrate, and may include much crystal defects. These decrease mobility speed of carriers to be generated when X-ray beams are radiated on the diamond plate. Hence, an interface between the growth surface and the substrate is scraped off by at least about 5 µm and is increased in smoothness, or is formed with a low resistivity layer, to thereby decrease influence to be exerted on monitoring performance of the diamond plate. The latter is simpler than the former, and for instance, the low resistivity layer may be used as an electrode to be used for detecting a current as later mentioned with reference to FIG. 15A showing the third embodiment. In addition, the formation of the low resistivity layer advantageously makes it possible to form a smaller metal electrode through which signals are read out and place the metal electrode farther away from a center of X-ray beams. The formation of the low resistivity layer makes it no longer necessary to polish both the growth surface and the interface, resulting in all of grown diamond being capable of being utilized. If necessary, polishing may be carried out.

The diamond plate to be used in the present invention may be synthesized in accordance with any of the vapor phase synthesis processes known in the art. A substrate on which diamond is to grow may be composed of Si, Mo or SiC. It is also possible to use polycrystal diamond having less grain boundary in growth direction. Such polycrystal diamond can be obtained by enhancing orientation in diamond vapor phase synthesis.

The low resistivity to be formed in the diamond plate can be formed by doping sufficient amount of impurities while diamond is made grown by vapor phase synthesis. Impurities to be doped include, for instance, B, Al, Li, P and Se. Among these impurities, boron (B) is preferable, because it can effectively provide electrical conductivity to diamond without deteriorating crystallinity.

It is preferable for the low resistivity layer to have a thickness equal to or greater than 5 µm. However, too great a thickness is not preferable because a portion having sensitivity to X-ray beams is made relatively small. Thus, the upper limit in thickness is about 50 µm. It is necessary for the low resistivity layer to be divided so that a metal electrode through which signals are to be read out is in contact with a low resistivity layer. In addition, it is preferable that shape and position of the divided low resistivity layers is identical on both surfaces of the diamond plate.

A method of forming the low resistivity layer includes the steps of forming a mask into a desired division shape, the mask being composed of material on which diamond cannot grow, and forming electrically conductive diamond on a substrate. The mask may be made of Mo, $SiO_2$ or Ti, for instance. After the formation of the electrically conductive diamond, the mask is removed. Thus, the divided low resistivity layers are completed. If a width of division or a gap between the divided low resistivity layers is too small, the cross talk between them may deteriorate the monitor performance. On the other hand, if the gap is too wide, the sensitivity for detection is also deteriorated. Thus, the gap of layers is preferable in the range of 0.5 µm to 2 mm. However, the gap is to be determined in dependence on the size of the X-ray beam. The number of divisions is preferably four (4) or greater in order to monitor the 2-dimensional beam position. In addition, it is preferable to divide the low resistivity layer symmetrically about the vertical and horizontal axes.

The dark current flowing in the diamond must be small while the signal current rapidly flows into electrodes. Accordingly, carriers present in the diamond need to have large mobility and small density. Thus, electric resistivity of diamond is preferably equal to or greater than $10^7$ Ω.cm, and more preferably in the range of $10^9$ to $10^{12}$ Ω.cm. It is preferable for diamond of low resistivity layer to have electric resistivity in the range of $10^{-3}$ to $10^2$ Ω.cm.

A metal electrode to which voltage is applied and through which a current signal is read out is required to be stable at high temperature and to have high radiation-resistance. Thus, the metal electrode is preferably composed of Ti, Mo, Pt, Au, Ni, Ta or Cr, for instance. The metal electrode may be formed by conventional methods such as vacuum deposition.

When a low resistivity layer is used as an electrode through which a current signal is detected, it is preferable for the metal electrode to be placed as far as possible away from beam's axis in order to avoid from being damaged by the X-ray beam.

In general the monitor is designed so that the X-ray beam passes through its center. Because the X-ray beams are attenuated, refracted and scattered by impinging the monitor, it is necessary to decrease these influences. Thus, as shown in the second embodiment illustrated in FIG. 12A and the third embodiment illustrated in FIG. 15A, there is formed a through hole at a point where most of X-ray beams pass, thereby it is possible to suppress the influence caused by presence of the monitor and also suppress thermal load on the monitor.

The X-ray beam has a certain distribution, and its size depends on the location of the monitor. A diameter of the through hole must be determined in consideration of the beam size. A preferable diameter of the through hole is in the range of 0.5 mm to 10 mm. The through hole may be formed by selective growth with the use of a mask.

The diamond plate may be formed thinner instead of forming the through hole. By forming such a thin film portion, the monitor may be formed as a monitor having a vacuum window.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to the drawings.

Figure 1:
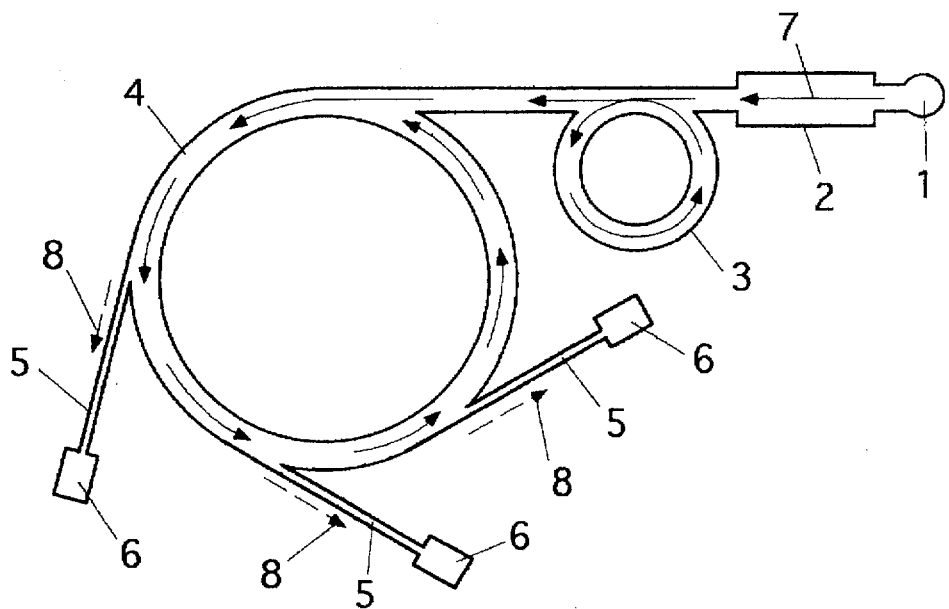
FIG. 1 is a schematic view illustrating a synchrotron radiation facility.
Figure 2A:
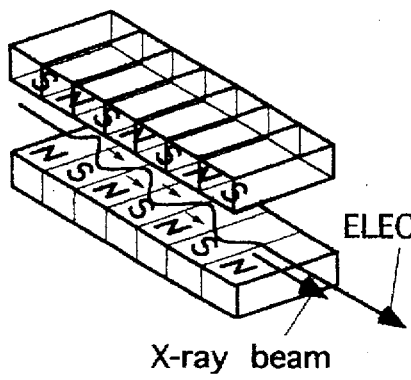
FIG. 2A is a schematic perspective view illustrating an undulator acting as an insertion device.
Figure 2B:
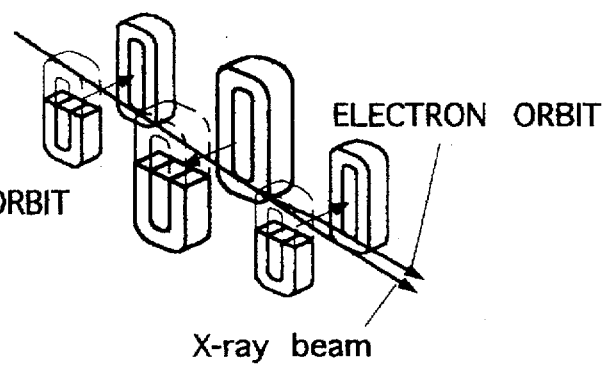
FIG. 2B is a schematic perspective view illustrating a wiggler acting as an insertion device.
Figure 3A:
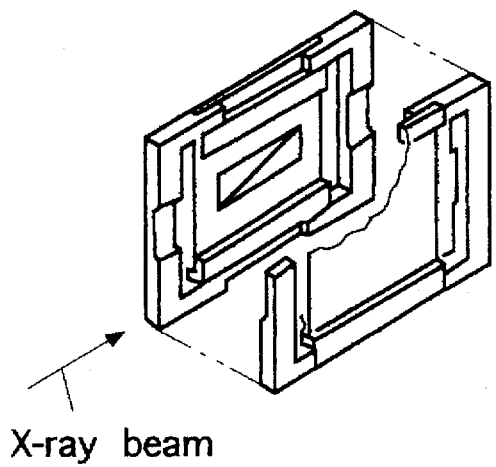
FIGS. 3A to 3D are perspective views of conventional X-ray beam position monitor with parts broken away for clarity.
Figure 3B:
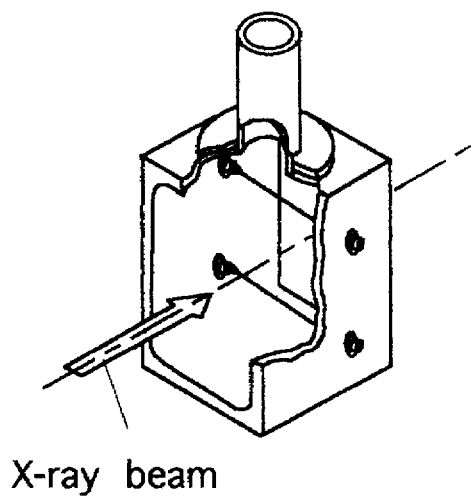
Figure 3C:
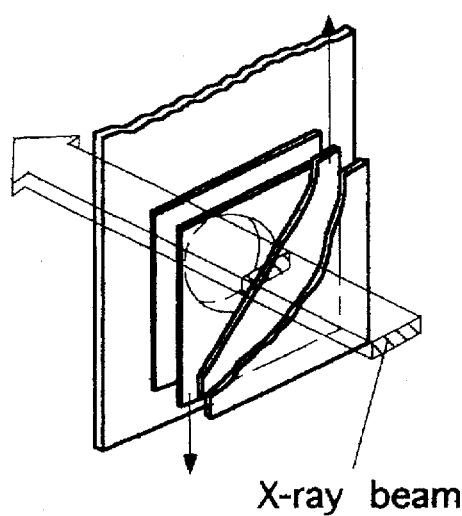
Figure 3D:
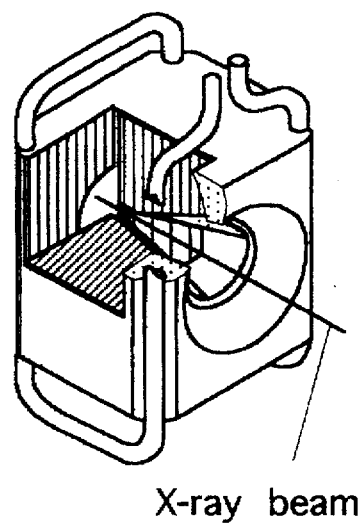
Figure 4:
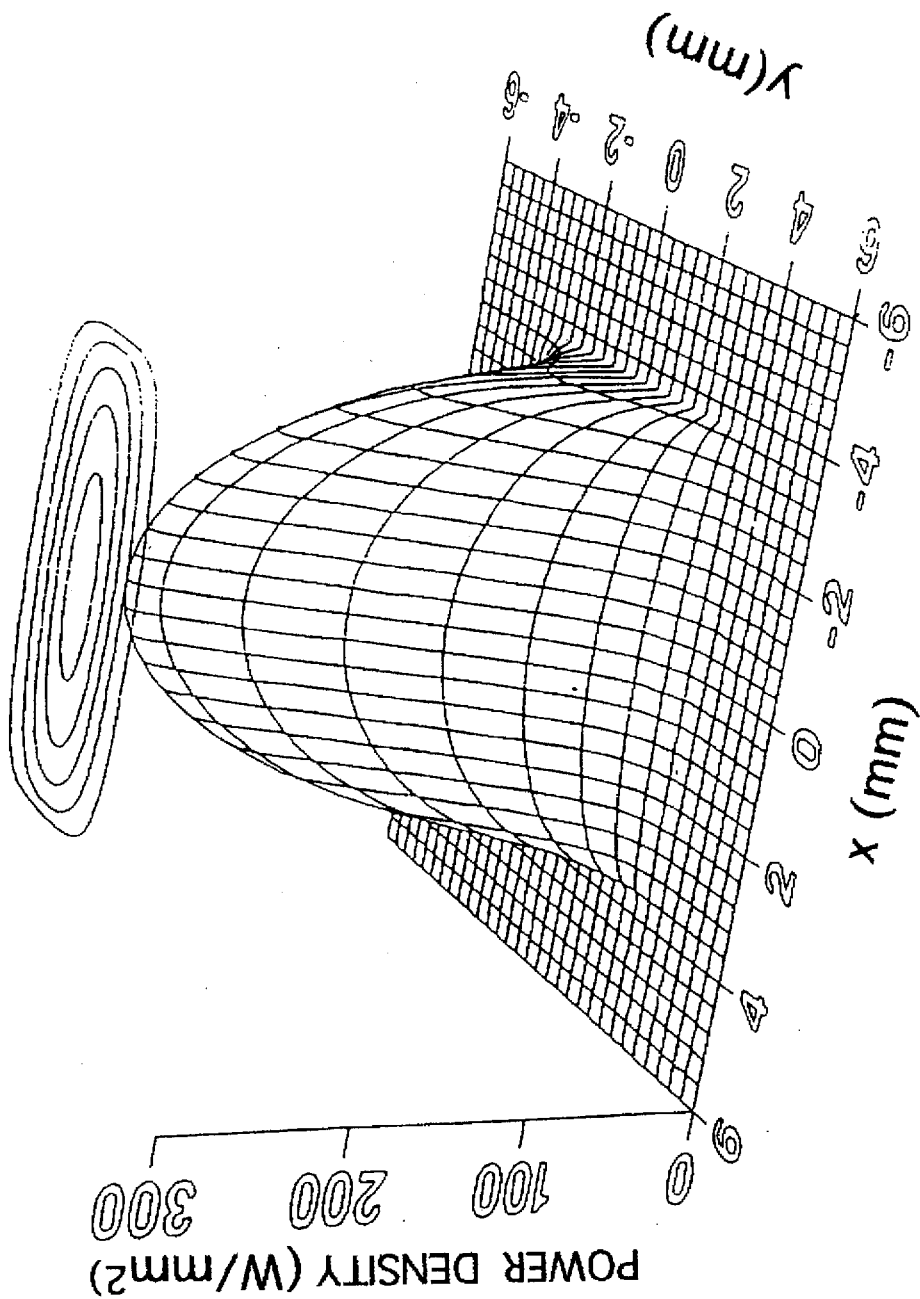
FIG. 4 illustrates spatial profile of power density of X-ray beams.

FIG. 4 illustrates a spatial profile of the power density of the X-ray beams. As shown in FIG. 4, X-ray beam distributes symmetrically about a beam axis. Specifically, the X-ray beam is point-symmetrical about a beam axis thereof, and is line-symmetrical about the X-axis and the Y-axis. Thus, it is possible to accurately calculate a center of X-ray beam based on the symmetry by measuring a profile of beam intensity. The present invention is based on such a principle.

Figure 5:
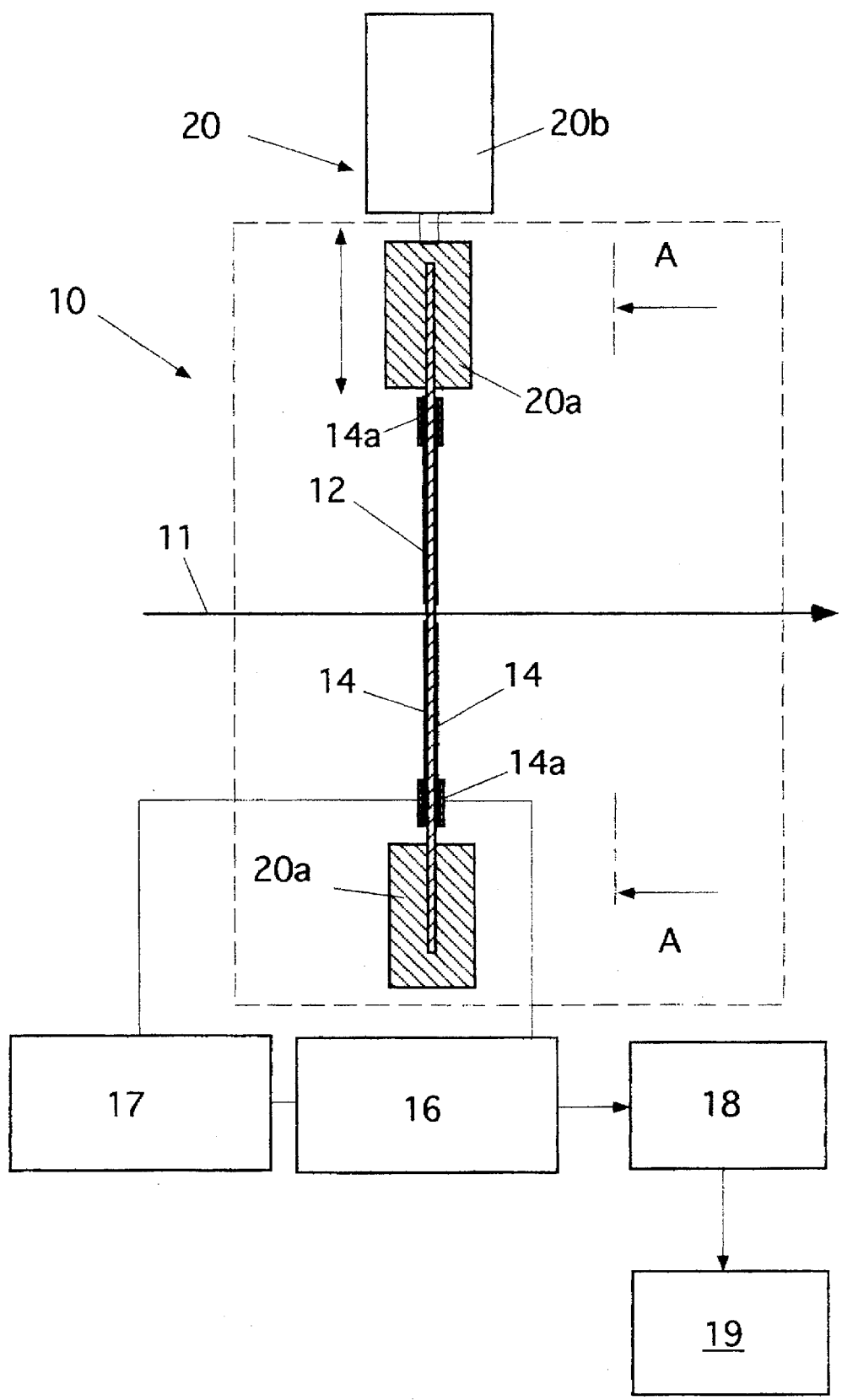
FIG. 5 is a schematic view of a X-ray beam position monitor made in accordance with the first embodiment of the present invention.
Figure 6:
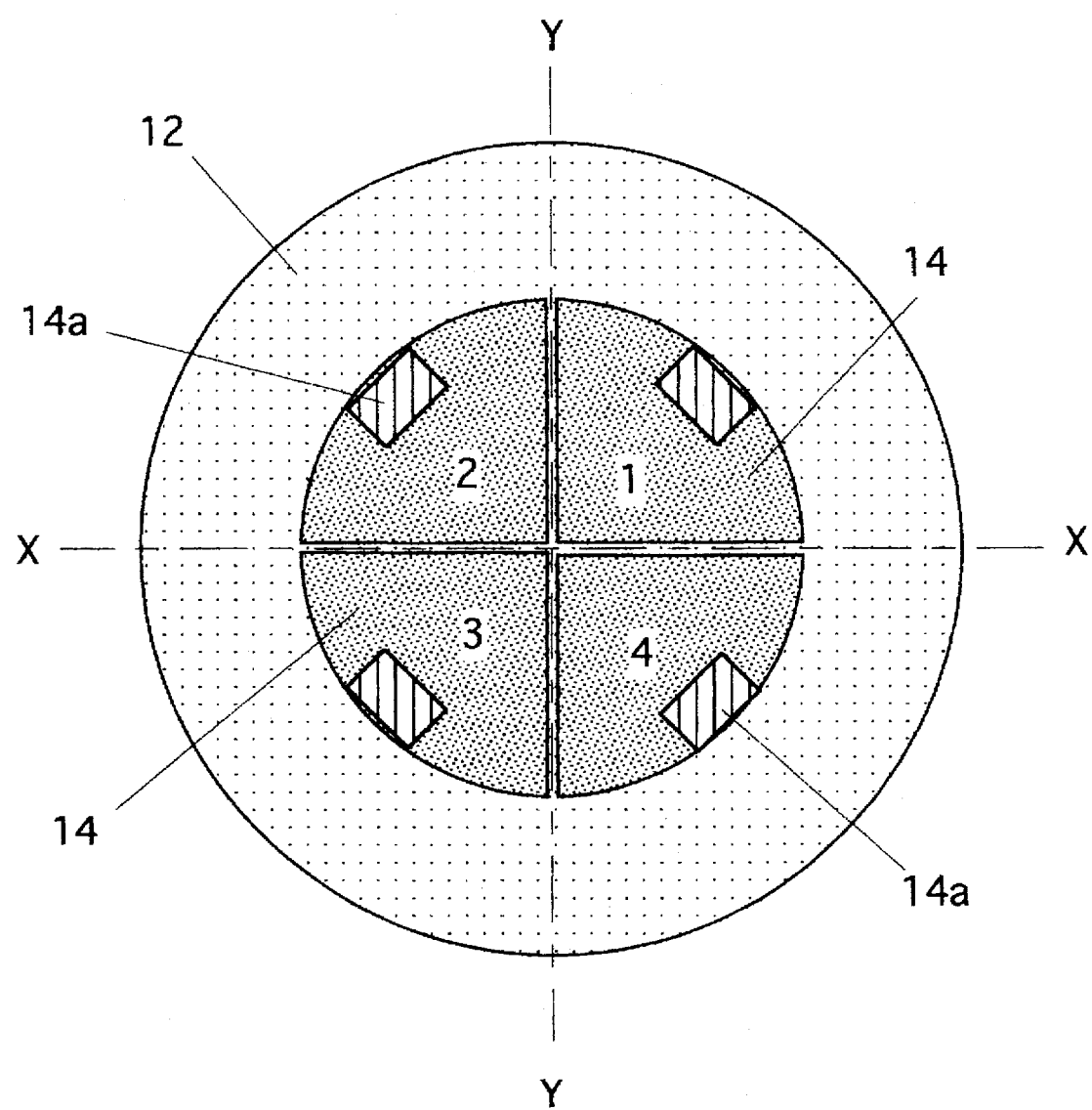
FIG. 6 is a side view taken along the line A—A in FIG. 5.

FIG. 5 is a schematic view of an X-ray beam position monitor made in accordance with the first embodiment of the present invention, and FIG. 6 is a side view taken along the line A—A in FIG. 5. As illustrated, the monitor 10 comprises a diamond plate 12 placed so that a X-ray beam 11 pass through the diamond plate 12, a plurality of electrode pairs 14 formed on both sides of the diamond plate 12, a DC current source 17 for applying a voltage to the electrode pairs 14, and a current measuring apparatus 16 for measuring a current flowing between electrodes pairs. It is preferable that the diamond plate 12 is placed perpendicularly to the X-ray beam 11 so that the X-ray beam 11 passes through the diamond plate 12 at its center.

In operation, when the X-ray beam 11 passes through the diamond plate 12, free carriers such as electrons and holes are generated in the diamond plate where the X-ray beam irradiates. By measuring a current flowing between the electrode pairs 14, it is possible to measure the intensity of the X-ray beam 11 passing through the electrode pairs 14. In addition, since the X-ray beam 11 distributes symmetrically about a center thereof as illustrated in FIG. 4, it is possible to find a center of the X-ray beam 11 by calculating a center of gravity based on the measured intensity of the X-ray beam 11 having passed through the electrode pairs 14.

It is preferable that the diamond plate 12 is constituted of a single plate, as illustrated in FIG. 6, which makes it easy to adjust relative positions between the electrode pairs 14 and the X-ray beam 11, thereby enhancing accuracy of monitoring position of the X-ray beam 11.

Figure 7:
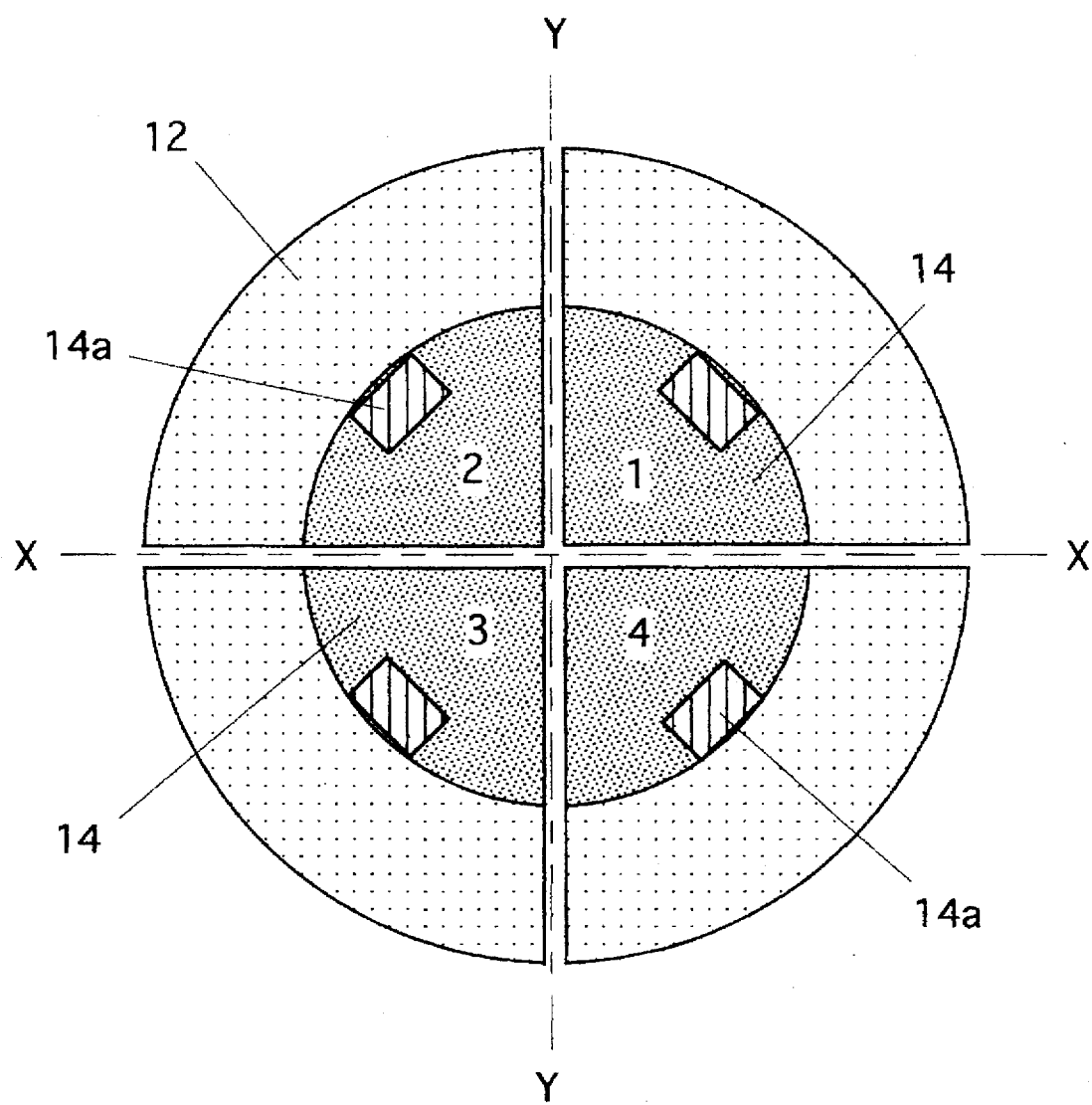
FIG. 7 is a cross-sectional view similarly to FIG. 6, but illustrates the second embodiment of the present invention.

The diamond plate 12 may comprises a plurality of arc-shaped plates, as illustrated in FIG. 7. In case of FIG. 7, though it is rather difficult to adjust relative position between the diamond plate 12 and the X-ray beam 11, it is possible to form the diamond plate 12 in smaller-size, resulting in that the diamond plate can be more easily manufactured. It is preferable that the diamond plate 12 is constituted of single crystal or polycrystal thin film diamond.

It is necessary to form the diamond plate 12 in accordance with a shape of the X-ray beam 11. It is preferable that the diameter of the diamond plate 12 is equal to or greater than 10 mm. A diamond plate having a large thickness has large thermal conductivity and thus can suppress its temperature rise, but absorbs large amount of radiation beam, resulting in a decrease in intensity of the X-ray beams to be used. Thus, a thickness of the diamond plate is determined taking the above mentioned matters into consideration and in dependence on manufacturing restrictions and costs. The preferable thickness is in the range of 50 μm to 400 μm.

A plurality of the electrode pairs 14 are arranged symmetrically about an intersection of the X-ray beam 11 with the diamond plate 12, such as a center of the diamond plate 12. The electrode pairs 14 may be formed in point-symmetry about a center of the diamond plate 12, or in line-symmetry about X-axis and Y-axis as illustrated in FIGS. 6 and 7. Thus, it is possible to accurately, calculate a center of the X-ray beam with ready operation based on the measured intensity of the X-ray beam.

It is preferable to form the electrode pairs 14 near a center of the diamond plate as much as possible in order to avoid their being influenced by background from the bending magnets. It is preferable to form the electrode pairs 14 at the same position on both surfaces of the diamond plate 12. In addition, it is preferable that the electrode pairs 14 of metal absorbing X-rays is small and has high electrical conductivity, heat-resistance and radiation-resistance.

The electrode pairs 14 are spaced away from one another with a certain a gap. Too wide gap decreases the area having sensitivity to X-ray beams, and hence deteriorates detection sensitivity. Thus, the gap is preferably in the range of 1/10 to 1/100 of the beam size. The number of division of the electrode pairs is preferably four (4) in order to concurrently monitor the 2-dimensional beam position, as illustrated in FIGS. 6 and 7. The number of division may be two (2), when beam position is to be monitored in each of X- and Y-axes independently.

For better contact of a signal cable to the electrode pairs 14, there may be formed electrodes 14a on surfaces of the electrodes 14 for reading out signals therethrough. The electrodes 14a is preferably composed of a material which provides good electrical contact with both to a signal cable and the electrode pairs 14. The electrodes 14a are electrically connected both to the DC current source 17 and the current measuring apparatus 16 through a signal cable. A voltage is applied across the electrode pairs 14 through the current measuring device 16, which measures a current flowing through the electrode pairs 14.

With reference to FIG. 5, the apparatus 10 further includes an arithmetic processing system 18 for calculating a beam position on the basis of the current measured by the current measuring apparatus 16, and a feed-back device 19 for carrying out feed-back control of a beam position on the basis of a beam position calculated by the arithmetic processing device 18.

When the radiation beam 11 passes through the diamond plate 12, free carriers such as electrons and holes are generated in the diamond plate 12 where the beam irradiates. Thus, it is possible to measure current (for instance, $I_1$, $I_2$, $I_3$ and $I_4$) flowing through the electrode pairs 14 by the current measuring apparatus 16. Since the radiation beam 11 distributes symmetrically about a center thereof, a center of gravity of the X-ray beam 11 can be calculated by the arithmetic processing system 18 in accordance with the following equations (1) and (2) based on measured current signals from each electrodes 14.

$$X = ((I_1+I_4)-(I_2+I_3))/(I_1+I_2+I_3+I_4) \quad (1)$$

$$Y = ((I_1+I_2)-(I_3+I_4))/(I_1+I_2+I_3+I_4) \quad (2)$$

In the equations (1) and (2), Ii (i=1, 2, 3 or 4) represents output current flowing through i-numbered electrode pairs in FIG. 6. In addition, if a difference between the beam and a center of a beam line can be detected, a position signal is fed-back to an insertion device such as an undulator and a wiggler through the feed-back system 19, in order adjust the beam position.

The monitor 10 in FIG. 5 further includes a linear actuator 20 with cooling mechanism for the diamond. The linear actuator 20 comprises a holder 20a attached to the diamond plate 12, and a motor 20b for moving the holder 20a. Components enclosed with a broken line in FIG. 5 are placed into the high vacuum condition of the beam line which ranges from $10^{-11}$ Torr to $10^{-10}$ Torr, for instance. The holder 20a is cooled with water, and thus the diamond plate 12 can be cooled through the holder 20a.

In addition, the linear actuator 20 allows the diamond plate 12 to move out of the X-ray beams 11. Thus, the diamond plate 12 is moved out of the X-ray beams 11 when on-line monitoring is not necessary, and hence, it is possible to avoid the radiation damage to the diamond plate. Furthermore, by monitoring the position of the radiation beam 11 while the diamond plate 12 is moved at short intervals, calibration of the monitor can be carried out.

As having been described so far, the monitor fabricated in accordance with the present invention includes the diamond plate 12 placed so that the beam passes through diamond plate, a plurality of the electrode pairs 14 formed on both sides of the diamond plate 12, and the current measuring apparatus 16 for measuring a current running through the electrode pairs 14 and applying a voltage across the electrode pairs 14. Thus, it is possible to detect intensity of the radiation beam 11 passing through the electrode pairs 14 by measuring a current flowing through the electrode pairs 14, which current is generated by free carriers such as electrons and holes which are created when the X-ray beam 11 passes through the diamond plate 12. In addition, since the beam line of the radiation beam distributes symmetrically about a center, it is also possible to find a center of radiation beam by calculating a center of gravity of the beam based on measured intensity of the beam passing through the electrode pairs.

Figure 8A:
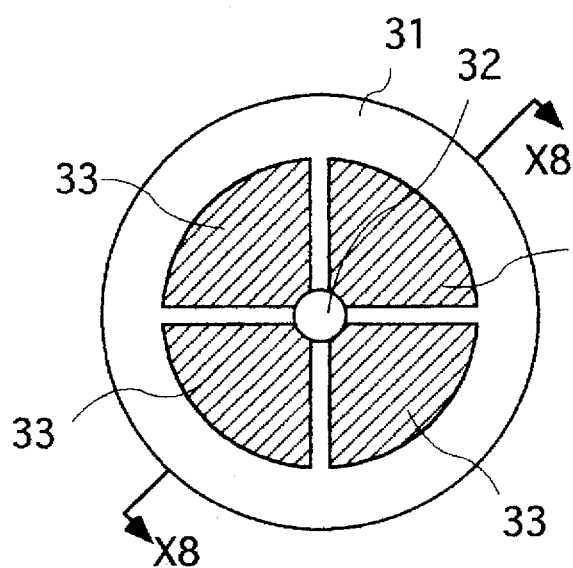
FIG. 8A is a plan view of a X-ray beam position monitor made in accordance with an embodiment of the present invention.
Figure 8B:
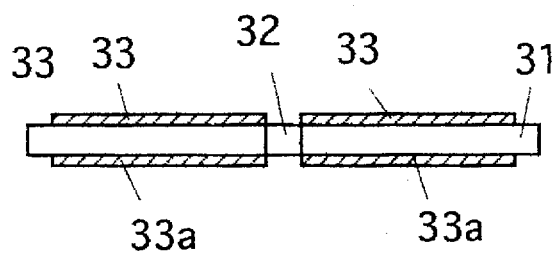
FIG. 8B is a cross-sectional view taken along the line X8—X8 in FIG. 8A.
Figure 9:
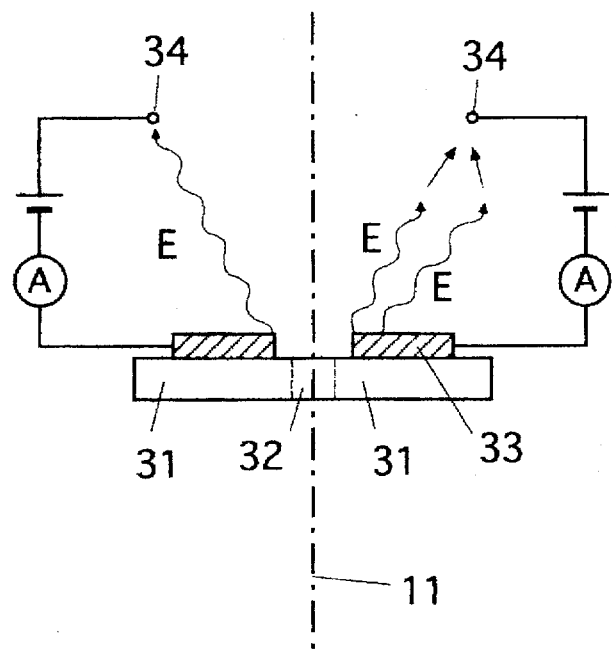
FIG. 9 is a schematic view illustrating a mechanism for detecting radiation beams based on photoelectron effect in a X-ray beam position monitor made in accordance with the present invention.
Figure 10:
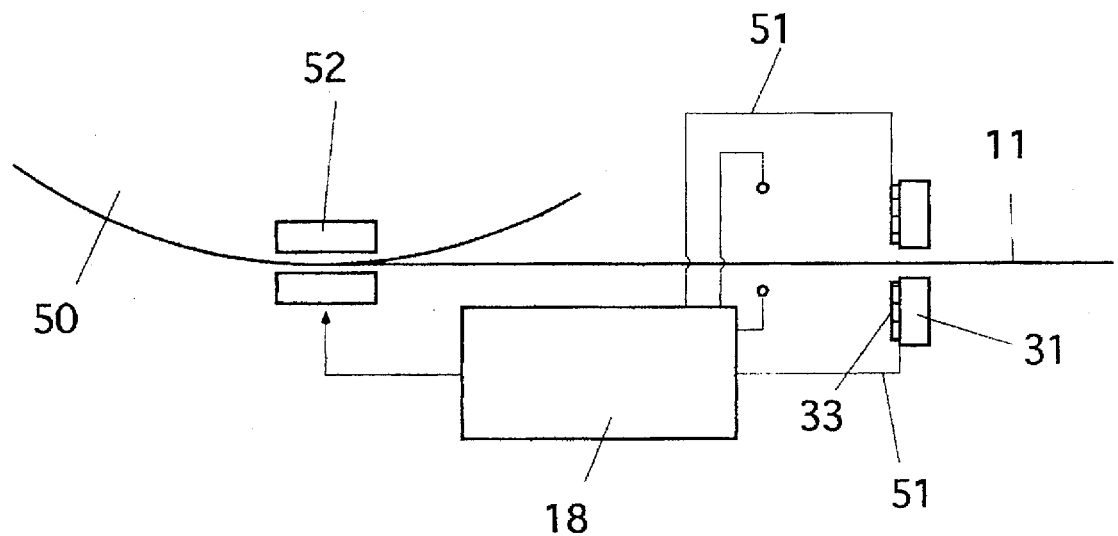
FIG. 10 is a schematic view of an X-ray beam position monitor by placing the monitor made in accordance with the present invention in a beam line.

FIGS. 8A and 8B are schematic views of a X-ray beam position monitor fabricated in accordance with another embodiment of the present invention, FIG. 9 is a schematic view showing operation of the monitor, and FIG. 10 is a schematic view of the monitor system for a beam line. With reference to FIGS. 8A and 8B, a diamond plate 31 is formed with a through hole 32 at a center, and metal film probes 33 and 33a are coated on both surfaces of the diamond plate 31.

In manufacturing of the illustrated monitor, there is first prepared a plate-shaped diamond or a self-sustaining diamond film 31. Then, the metal film probes 33 and 33a are coated on both surfaces of the diamond plate 31. It is preferable to arrange the metal film probes 33 and 33a at the same location on both surfaces of the diamond plate 31. As illustrated in FIG. 9, when a X-ray beam 11 irradiates the metal film probes 33 and 33a, photoelectrons E are emitted from a surface of the metal film probe 33. Collector 34 to which a positive potential is applied capture the electrons E emitting from the metal film probe 33. Therefore the probes and collector act as a radiation beam detecting device. It is necessary to form at least two, preferably at least four, metal film probes and collector on either side of the diamond plate 31 in order to monitor position of the radiation beam 11. It is possible to calculate a center of gravity of the beam based on current signal from each probe.

The metal film probe 33 or 33a and the collecting probe 34 may be placed only on one side of the diamond plate 31. Instead of the collector 34, the metal film probes 33 and vacuum vessel may be arranged to have a negative and ground potential.

As illustrated in FIG. 9, the diamond plate 31 with the metal film probes is placed perpendicularly to the radiation beam 11, and a positive potential is applied to the collector 34. The probe 33 act as a active element for detecting a photoelectron current. Thus, it is possible to calculate a center of gravity of the radiation beam based on the current signal from each probe. Thus, the illustrated monitor can measure the beam position. As illustrated in FIG. 10, signals are transmitted to the arithmetic processing system 18 through cable 51 attached to the metal film probes 33. The arithmetic processing system 18 calculates a center of gravity of the beam, and feeds back the result to a device 52 for adjust an electron orbit, thereby making it possible to control the beam position with higher accuracy.

In a conventional X-ray beam position monitor utilizing photoelectron effect, blade-shaped metal plates are placed in parallel with X-ray beams. However, there is a problem that with the increase of the beam power these days, a blade may be damaged if beams are deviated for some reason. In addition, another problem is that a metal plate interrupts X-ray beams.

In the present invention, a diamond plate with thin metal films is placed perpendicularly to X-ray beams. In accordance with the structure of the present invention in which thin metal films are coated on a diamond plate, since diamond has large thermal conductivity and radiation-resistance, the probe is unlikely to be damaged, even if the diamond plate is placed perpendicularly to the X-ray beam. In addition, the high transmission of the beams in diamond decreases attenuation of the beams.

Because, the monitor fabricated in accordance with the present invention has an integral structure in which a plurality of radiation beam detecting elements are formed on a single diamond plate, and it lowers manufacturing cost and brings easy installation into a beam line, adjustment and repair.

It is preferable for metal of the probe to have high radiation-resistance, stay stable in vacuum at temperature in the range of room temperature to 1000° C., and have sufficient thermal conductivity. Such a metal is selected preferably from Al, Cu, Be, W or Mo, and more preferably from Al, Cu or Be.

If the metal film probe is thick, it is difficult to transfer heat to the diamond plate, and, on the other hand, if it is thin, there would arise a problem of peeling. Thus, it is preferable for the metal film probe to have a thickness ranging from about 0.1 μm to about 10 μm.

It is preferable that the metal film probes are formed as close as possible to a center of the X-ray beam. However, if the metal film probes are formed too close to the center, the probes may be damaged. If a gap between the metal film probes is too small, the cross talk between them may deteriorate the monitor performance. To the contrary, if the gap is too wide, the sensitivity for detection is also deteriorated. The division gap is to be determined in dependence on size of the beam, but is preferably in the range of about 0.5 μm to about 2 mm.

Figure 11:
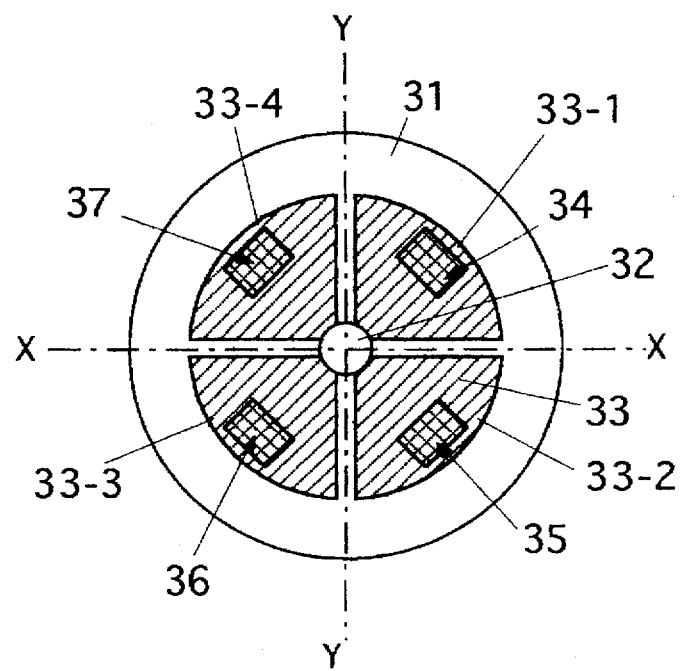
FIG. 11 is a plan view of an embodiment of the monitor made in accordance with the present invention.

It is necessary to arrange at least two metal film probes at either side of the diamond plate in order to monitor beam position. It is preferable to arrange at least four metal film probes symmetrically about a center of a beam path, as illustrated in FIG. 11. In addition, it is preferable that the probes cover a surface of the diamond plate as widely as possible.

A diamond plate to be used for the present invention needs to be shaped in accordance with a shape of a beam. When a circular diamond plate is to be used, it is required to prepare plate type diamond having a diameter equal to or greater than 10 mm. Hence, it is difficult to make artificially synthesized diamond under high temperature and high pressure or to obtain natural diamond with the required size. Even if obtained, such diamond would be quite expensive. On the other hand, diamond to be synthesized in accordance with vapor phase synthesis has an advantage that diamond with larger surface area can be fabricated at low costs.

The diamond plate may be composed of single crystal diamond or polycrystal diamond. Polycrystal diamond can be fabricated at lower cost. Both of single crystal and polycrystal diamond may be used in combination.

As mentioned earlier, since the diamond plate to be used for the present invention needs to be shaped in accordance with a shape of the X-ray beam, the diamond plate ordinarily has a diameter of 10 mm or greater. The diamond plate has a thickness of preferably 10 μm or greater, and more preferably 50 μm or greater. If the diamond plate were too thick, it would be expensive. Hence, the diamond plate has a thickness preferably thinner than 1 mm in view of costs. The preferable thickness of the diamond plate is in the range of 50 μm to 400 μm.

The diamond plate to be used in the present invention may be synthesized in accordance with any of vapor phase synthesis processes known in the art. A substrate on which diamond is grown may be composed of Si, Mo or SiC.

In general, the apparatus is designed so that radiation beams passes through a center of the monitor. The X-ray beams are attenuated, refracted and scattered by impinging the monitor, it is necessary to decrease these influences. Thus, there is formed a through hole at a point where most of X-ray beams pass, thereby it is possible to suppress the influence caused by presence of the monitor and also suppress thermal load on the monitor.

The X-ray beams have a certain distribution, and it's size is depend on the location of the monitor. A diameter of the through hole must be determined in consideration of the beam size. A preferable diameter of the through hole is in the range of about 0.5 mm to about 2 mm. The through hole may be formed by selective growth with the use of a mask.

The diamond plate may be formed thinner instead of forming the through hole. A thickness of the thinner portion of the diamond plate is determined in dependence on operation conditions and a diameter of the thinner portion, but is necessary to be at least 10 µm in terms of requisite strength. It is preferable for the thinner portion to have a diameter in the range of about 0.5 mm to about 2 mm. By forming the thinner portion, the monitor can be also used as a vacuum windows.

The thin metal probe can have greatest sensitivity by placing it near the center of the diamond plate. Such a structure provides higher sensitivity and accuracy. However, if the metal probes are remarkably damaged, they may be placed slightly away from center of the diamond plate, even in which case the sensitivity and accuracy are enhanced relative to a conventional monitor.

A metal electrode through which signals are to be read out is preferably composed of material having stability at high temperature and possibly high radiation-resistance. For instance, the metal electrode is made of Ti, Mo, Au, Ni, Pt, Ta or Cr. It is preferable for the metal electrode to be placed away form a center of the X-ray beam. The metal electrode can be disposed by conventional process such as vacuum deposition.

Hereinbelow will be described a detailed structure of a X-ray beam position monitor, and results of the experiments.

[EXAMPLE 1: Provision of Metal Electrodes]

A test of a X-ray beam position monitor having a diamond plate made of artificial polycrystal diamond was carried out. It has a diameter of 15 mm and a thickness of 0.2 mm. A gold thin film having a diameter of 15 mm and a thickness of 0.1 µm was used as electrode and it was divided into four sections. The gap width between the electrodes is 0.2 min.

In the monitor illustrated in FIG. 5, the diamond plate 12 was held by the holder 20a made of copper which could be vertically moved by the linear actuator 20b. Vacuum chamber were equipped with a beam port through which a X-ray beam is to pass and a port for pumping. A bias voltage was applied between the electrode pairs 14 formed on the both sides of the diamond plate 12, and a current flowing through the electrode pairs 14 was converted into a voltage by a current amplifier. The converted voltage was fed to the arithmetic processing system 18.

The monitor having the structure as mentioned above was installed in a beam line, and the test was carried out. The apparatus has the four electrode pairs 14 formed on both sides of the diamond plate 12. A voltage was applied to each of the electrode pairs, and position of the X-ray beam was detected on the basis of current signals from four electrodes. The X-ray beam width is about 1 mm and it passes perpendicularly through a center of the diamond plate 12. If the radiation beam 11 is deviated from a center of a beam line, the deviation of the X-ray beam can be calculated in accordance with the earlier mentioned equations (1) and (2).

The specification of the synchrotron radiation facility and insertion device in this example was as follows:

Electron beam energy: 6.5 GeV
Electron beam current: 50 mA
Insertion device: Undulator
Maximum flux density: About $1\times10^{16}$ photons/s mrad$^2$ 0.1% b.w.

When the X-ray beam irradiated the monitor, the total maximum current from the four electrodes was about 1 mA. The voltage applied to the electrodes was 400 V. There was obtained the position resolution of 10 µm or smaller in both X- and Y-axes. In addition, it was possible to control the beam position at high speed by feed back control to the undulator.

The monitor can be installed in high vacuum condition. Due to the characteristics of diamond, the monitor is capable of withstanding high-powered radiation beams for long time, namely, having radiation-resistance and heat resistance, and providing quick response. Due to the use of the thin diamond plate having high transparency to the beam, the monitor is capable of having less beam loss, namely, having high transmission. Due to the symmetrical structure about a center of a beam line, the monitor is capable of providing high accuracy beam position measurement. Use of thin film diamond having been recently developed brings a easy fabrication and low cost.

[EXAMPLE 2: Provision of Through Hole and Metal Electrodes]

Figure 12A:
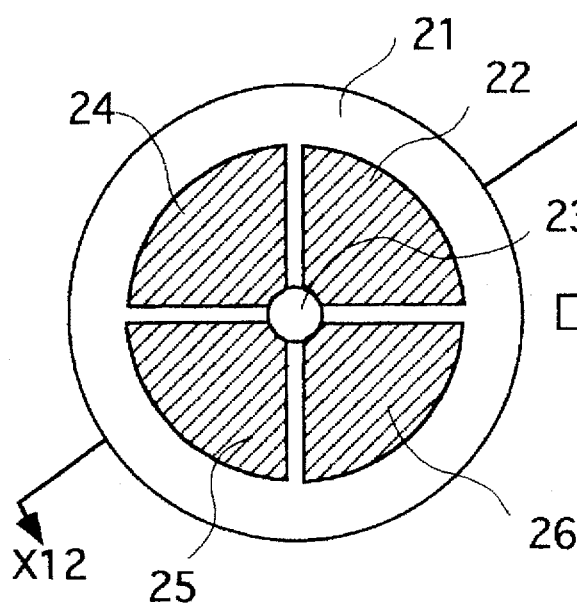
FIG. 12A is a plan view of the monitor made in accordance with the third embodiment of the present invention.
Figure 12B:
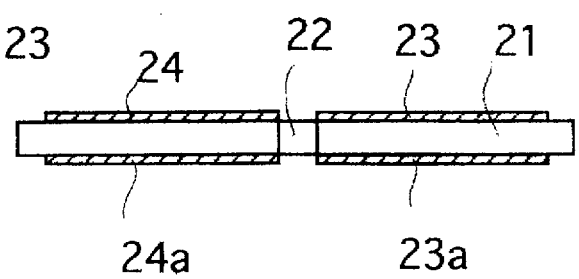
FIG. 12B is a cross-sectional view taken along the line X12—X12 in FIG. 12A.

FIGS. 12A and 12B shows a diamond plate 21 to be used in the third embodiment of the present invention. A plurality of pairs of metal electrodes 23 and 23a, 24 and 24a, 25 and 25a (not illustrated), 26 and 26a (not illustrated) through which a current is detected are attached to the diamond plate 21. The diamond plate 21 has a through hole 22 in the center.

Figure 13:
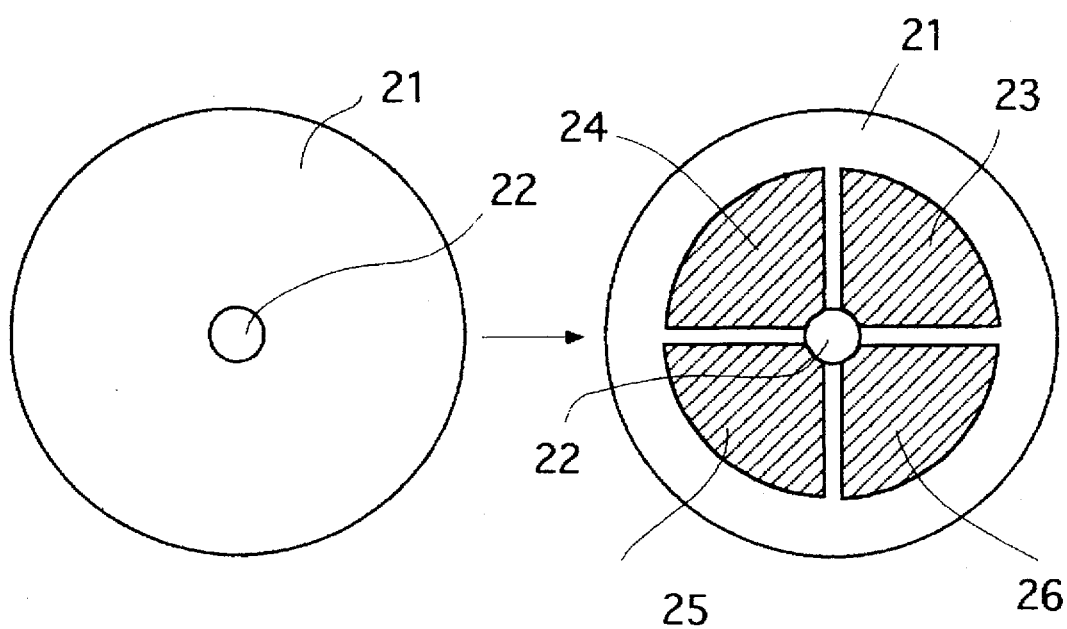
FIG. 13 is a schematic view showing steps of fabricating the apparatus in accordance with the second embodiment of the present invention.

Hereinbelow will be explained a method of fabricating the X-ray beam position monitor made in accordance with the present invention. As illustrated in FIG. 13, the plate-shaped diamond plate 21 is first prepared. Then, the metal electrodes 23, 23a, 24, 24a, 25, 25a, 26, 26a are coated on both sides of the diamond plate 21. It is preferable for the metal electrodes to be placed at the same position on both sides of the diamond plate 21. When X-ray beam irradiates the diamond plate 21, free carriers are generated in the diamond plate 21 with a voltage being applied between each of the electrode pairs. Signal currents are thus detected. It is necessary to arrange at least two, preferably at least four electrode pairs.

A method of fabricating the monitor of the example 2 is described hereinbelow.

A thin titanium (Ti) film having a diameter of 1 mm and a thickness of 0.5 µm was grown on a center of a silicon substrate having a diameter of 20 mm and a thickness of 2.5 mm. Then, diamond was deposited by 260 µm thickness on a surface of the silicon substrate on which the thin Ti film was formed, by micro-wave plasma enhanced chemical vapor deposition. The deposition was carried out on the following conditions:

Source gas: 1.5 % $CH_4$ mixture gas at 250 sccm and Ar gas at 45 scmm Pressure: 80 Torr
Substrate Temperature: 900° C.
Micro-wave output: 800 W
Time: 140 hours After the diamond completed its growth, the thin Ti film and a portion of the silicon substrate located below the Ti film were dissolved and removed. Thus, there was obtained a diamond polycrystal plate 21 formed centrally with a through hole 22 having a diameter of 1 mm, as illustrated in a left drawing in FIG. 13. The thus obtained diamond polycrystal plate has a diameter of 20 mm, a thickness of 0.26 mm, and resistivity of $3.3\times10^9$ Ω.cm. Then, vacuum deposition was carried out by using a metal mask to thereby form eight Ti/Pt/Au electrodes 23, 24, 25, 26 and 23a, 24a, 25a, 26a (all not illustrated) on upper and lower surfaces of the diamond plate 21, respectively.

Figure 14:
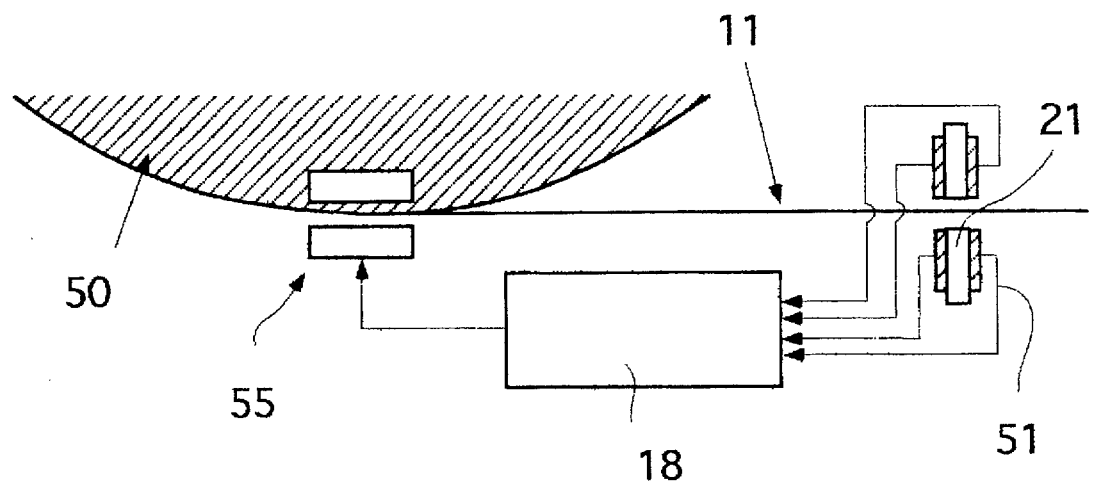
FIG. 14 is a schematic view of an equipment for monitoring X-ray beams by placing the monitor made in accordance with the present invention in a beam line.

The thus fabricated X-ray beam position monitor 30 including the diamond polycrystal plate 21 was installed on a front end of the beam line, as illustrated in FIG. 14. It is considered that the apparatus is comprised of four pairs of radiation detecting devices corresponding to the electrode pairs. The beam position deviation was measured through signal currents from each electrode. In general, the beam having the power distribution as illustrated in FIG. 4 was irradiate perpendicularly on the diamond plate at a center. If the beam is deviated from a center of the diamond plate, a current flowing through each of the electrode pairs is changed in value. Thus, it is possible to detect the deviation of the beam by calculating a center of gravity of the beam in accordance with the above mentioned equations (1) and (2).

A signal representing the beam deviation is fed back to the insertion device to adjust for the beam position.

The thus fabricated X-ray beam position monitor was tested on the same conditions as the example 1. Similarly to the results of the example 1, good results on high speed and high accuracy was obtained. In addition, since most of the X-ray beam passes through the through hole 22 of the diamond plate 21, the beam was only slightly attenuated even after passage of the beam through the diamond plate. Furthermore, scattering of the beam downstream of the monitor was not found. The detection sensitivity and controllability of beam position remain unchanged even after 3 weeks use. In addition, the diamond plate and metal electrodes were observed after the test. Damage to the monitor by the irradiation of the beam could not be found.

[EXAMPLE 3: Provision of Through Hole and Diamond Electrode Including B-doped Conductive Layer]

Figure 15A:
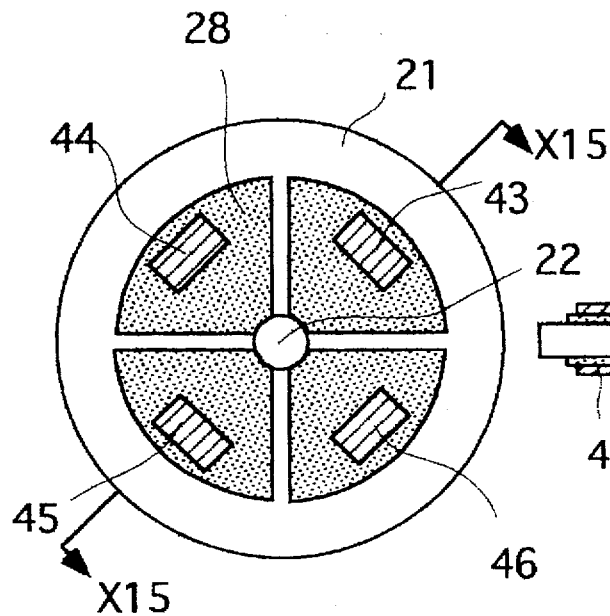
FIG. 15A is a plan view illustrating a X-ray beam position monitor made in accordance with the fourth embodiment of the present invention.
Figure 15B:
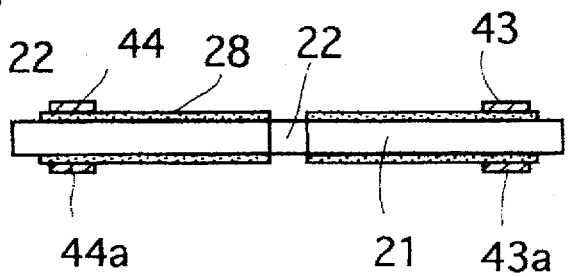
FIG. 15B is a cross-sectional view taken along the line X15—X15 in FIG. 15A.

FIGS. 15A and 15B show a diamond film 21 to be used in the fourth embodiment of the present invention. The diamond plate 21 has a plurality of pairs of low resistive diamond electrodes 28 formed on both surfaces of the diamond plate instead of the metal electrodes 23 to 26 and 23a to 26a illustrated in FIGS. 12A and 12B. Metal electrodes 43 to 46 and 43a to 46a through which signals are read out are placed on the conductive layers 28. Similarly to the monitor illustrated in FIGS. 12A and 12B, it is preferable to arrange at least two, preferably at least four, conductive layers on both surfaces of the diamond plate 21 at the same position.

Hereinbelow will be explained a method of fabricating the monitor of this example.

Figure 16A:
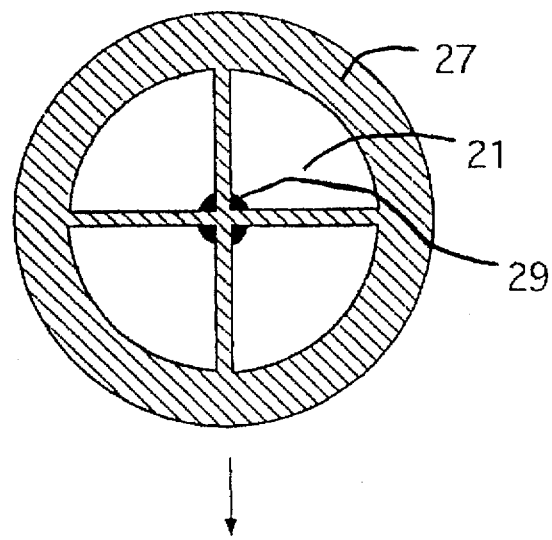
FIG. 16 is a schematic view showing steps of fabricating the apparatus in accordance with the fourth embodiment of the present invention.
Figure 16B:
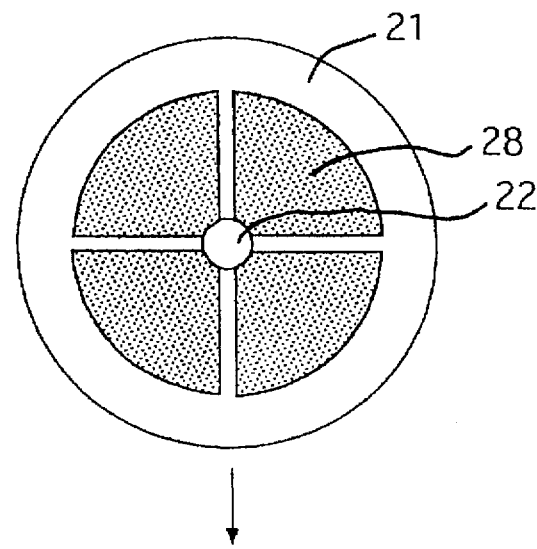
Figure 16C:
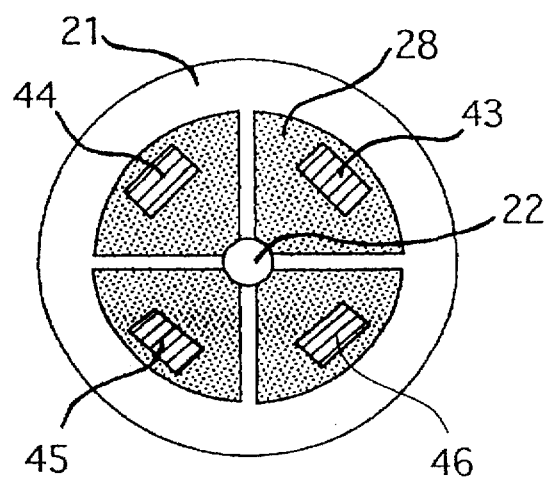

A thin titanium (Ti) film having a diameter of 1 mm and a thickness of 0.5 µm was grown on a center of a silicon substrate having a diameter of 20 mm and a thickness of 2.5 mm. Then, diamond was deposited by 250 µm thickness on a surface of the silicon substrate on which the thin Ti film was formed, by micro-wave plasma enhanced chemical vapor deposition on the same conditions as the example 2. Then, the silicon substrate was taken out of a CVD apparatus, and molybdenum (Mo) was evaporated by 0.3 µm thickness on a surface of the diamond film 21 as a mask 27, as illustrated in section A in FIG. 16. Then, micro-wave plasma enhanced CVD was carried out to thereby deposit boron-doped diamond layers 28 on the same conditions as the example 2 except that the source gas includes 500 ppm $B_2H_6$-$H_2$ mixture gas at 3 sccm. The boron-doped diamond layers 28 have a thickness of about 15 µm, and act as an electrically conductive layer. The Boron content was determined with SIMS (secondary ion mass spectroscopy) with the result of $8 \times 10^{16}$ $cm^{-3}$.

Then, the silicon substrate and the mask 27 made of Mo were dissolved for removal. Then, a mask composed of Mo was formed, and boron-doped layers having a thickness of about 15 µm were formed also on a reverse surface of the diamond film 21. Thus, there was obtained the diamond plate 21 having a diameter of 20 mm and a thickness of 250 µm, and having the boron-doped layers 28 having a thickness of about 15 µm on opposite surfaces thereof and formed centrally with a through hole 22, as illustrated in section B in FIG. 16. Vacuum deposition was carried out by using metal masks to thereby deposit eight Ti/Pt/Au electrodes 43 to 46 and 43a to 46a (not illustrated) on the boron-doped layers 28, as illustrated in section C in FIG. 16.

The fabricated monitor with the boron-doped conductive layers was tested on the same conditions as the example 1. As a result, good performance on high speed and high accuracy was obtained. In addition, S/N ratio on detection signals was improved in comparison with an monitor having no boron-doped layers, and thus the example 3 had totally higher performance than the examples 1 and 2.

[Reference 1]

Figure 17A:
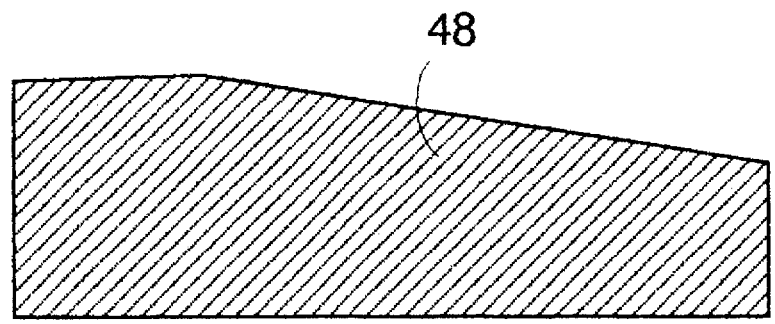
FIG. 17A is a cross-sectional view of a conventional blade type X-ray beam position monitor.
Figure 17B:
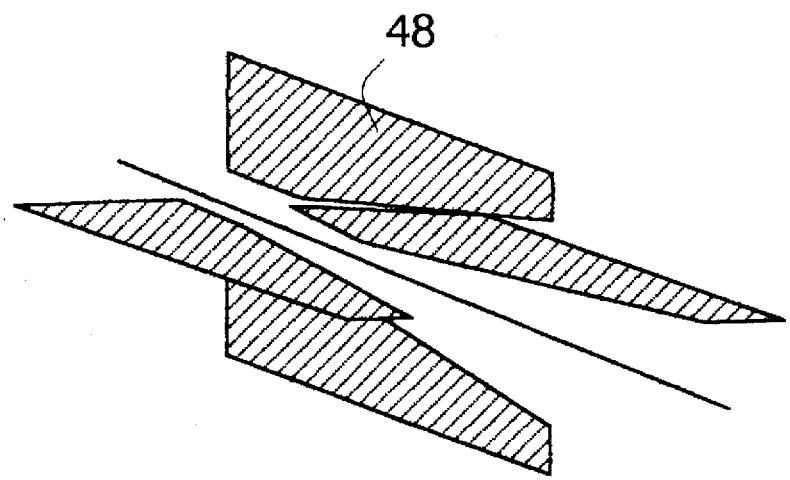
FIG. 17B is a perspective view of a conventional blade type X-ray beam position monitor.

A conventional blade type monitor 48 with the tungsten (W) blade, a cross-section of which is illustrated in FIGS. 17A and 17B, was tested for the comparison on the same conditions as the example 2. There was obtained results that the example 3 shows better performance than conventional blade monitor in terms of sensitivity, accuracy for monitoring position, and monitoring speed.

[EXAMPLE 4]

Figure 18:
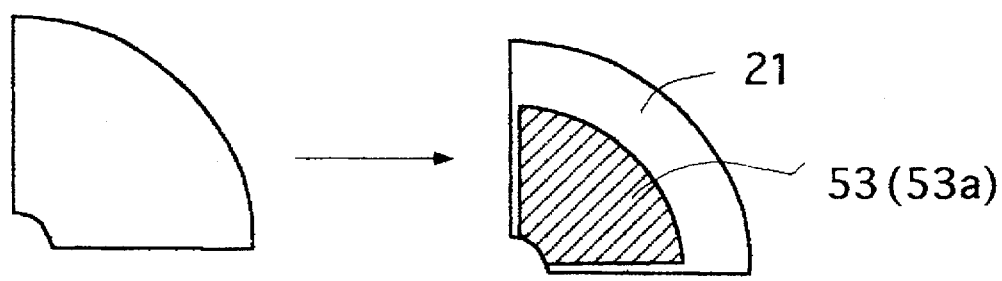
FIG. 18 is a schematic view showing steps of fabricating the apparatus in accordance with the fifth embodiment of the present invention.

Diamond was grown by 250 µm thickness on the same conditions as the example 2 except that the silicon substrate (φ20 mm×t 2.5 mm) used in the example 2 was equally divided into four sections, namely arc-shaped sections as illustrated in FIG. 18. After removal of the silicon substrate, metal electrodes 53 and 53a (not illustrated) each having arc shape as illustrated are formed on both surfaces of the diamond film, similarly to the example 2. Thus, there were completed four arc-shaped radiation detecting devices. These four radiation detecting devices were arranged in a circle having the same outer diameter as the example 2, and they were tested on the same conditions as the example 2. The example 4 exhibited the same results as the example 2 in terms of sensitivity, monitoring speed and durability, but slightly inferior to the example 2 in terms of position monitoring accuracy. In addition, it was necessary to check whether the radiation detecting devices were exactly placed during the arrangement of the four radiation detecting devices. As a result, it is concluded that single diamond plate with dividing electrodes are superior to detection devices using ¼-divided diamond plates.

As described, the X-ray beam position monitor includes a diamond plate on which a plurality of pairs of metal electrodes or conductive diamond layer electrodes, namely a diamond plate on which a plurality of radiation detection devices are formed. The monitor is placed perpendicularly to X-ray, as illustrated in FIG. 14, and acts as a plurality of radiation detecting devices which detect a current generated by free carriers created when the radiation beam irradiate on the diamond with a voltage being applied between the electrode pairs. A center of gravity of radiation beam can be calculated based on current signal from electrode, and thus the illustrated monitor can monitor the beam position. Signals are transmitted to the arithmetic processing system 18 through the cable 51 connected to the electrodes. The arithmetic processing system 18 calculates a center of gravity of the beam, and feeds back the result to a beam position control system 55 to adjust the beam position, thereby making it possible to control the beam position with higher accuracy.

The X-ray beam position monitor made in accordance with the present invention still has the following merits of diamond: high radiation-resistance; superior electrical and mechanical properties under high temperature conditions; low noise; high S/N ratio; and a simple structure without a p-n junction.

In other words, the monitor has higher sensitivity since electron-hole pairs are generated through entire diamond unlike other semiconductor detector which generates electron-hole pairs only in a depletion layer in the p-n junction. In addition, the generated carriers have large mobility, and hence the monitor can operate at higher speed. Furthermore, the monitor has great heat-resistance, and thermal load can be decreased due to the use of diamond.

[EXAMPLE 5]

A thin titanium (Ti) film having a diameter of 1 mm and a thickness of 0.5 μm was grown on a center of a silicon substrate having a diameter of 20 mm and a thickness of 2.5 mm. Then, diamond was deposited by 260 μm thickness on a surface of the silicon substrate on which the thin Ti film was formed, by micro-wave plasma enhanced chemical vapor deposition. The deposition was carried out on the following conditions:

Source gas: 1.5% $CH_4$-$H_2$ mixture gas at 250 sccm and Ar gas at 45 scmm

Pressure: 80 Torr

Substrate Temperature: 900° C.

Micro-wave output: 800 W

Time: 140 hours

Figure 19A:
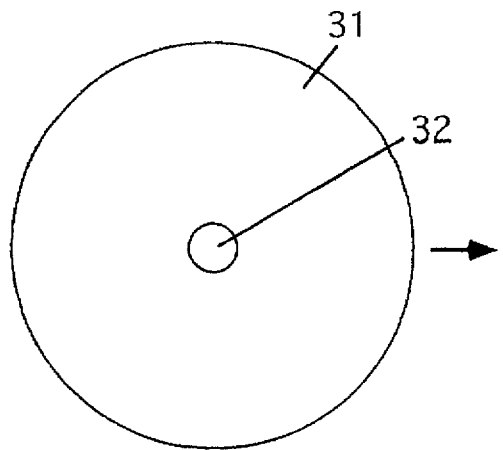
FIG. 19 is a schematic view showing steps of fabricating the apparatus in accordance with the present invention.
Figure 19B:
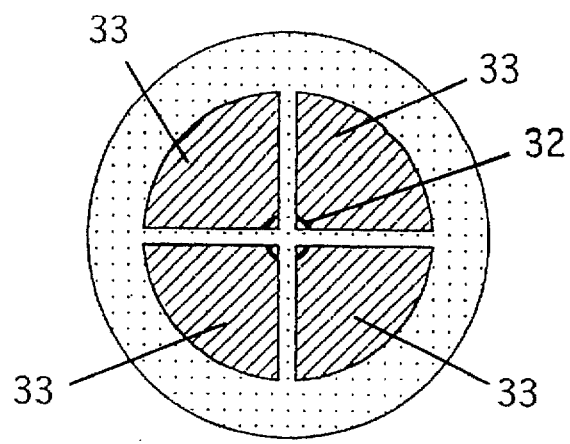
Figure 19C:
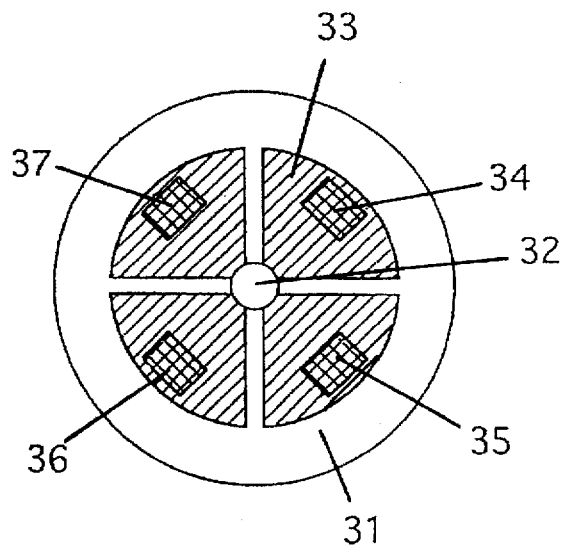

After diamond completed its growth, the thin Ti film and a portion of the silicon substrate located below the Ti film were dissolved for removal. Thus, there was obtained a diamond polycrystal plate 31 formed centrally with a through hole 32 having a diameter of 1 mm, as illustrated in FIG. 19-A. The thus obtained diamond polycrystal plate has a diameter of 20 mm, a thickness of 0.26 mm, and resistivity of $3.3 \times 10^9$ Ω.cm. Then, vacuum deposition was carried out using a metal mask to thereby deposit metal film probes 33 and 33a (not illustrated) made of aluminum (Al) on upper and lower surfaces of a diamond plate 31 by 1.5 μm thickness, as illustrated in FIG. 19-B. Then, electrodes 34 to 37 and 34a to 37a (not illustrated) through which signals are read out are disposed on the thin aluminum films 33 and 33a one by one, as illustrated in FIG. 19-C. Each of the electrodes 34 to 37 and 34a to 37a is composed of a multi-layered structure of Ti/Pt/Au.

The thus fabricated monitor (φ20 mm×t 0.26 mm) is placed in a beam line, as illustrated in FIG. 10. As illustrated in FIG. 11, the monitor includes four radiation beam detecting devices 33-1, 33-2, 33-3 and 33-4 each comprising the thin aluminum film or metal film probe 33, and a collector (not illustrated) disposed outside. A voltage is applied between the metal film probes 33 and the collecting electrodes, and the beam deviation was monitored with the four radiation detecting devices. The radiation beam having a width of about 1 mm is normally radiated perpendicularly to the diamond plate at the center. If the beam is deviated from the center, a signal current from the probes is changed, and hence the deviation of the radiation beam can be detected by calculating a center of gravity of the beam in accordance with the following Equations 1.

[Equations 1]

$$X=((I_1+I_2)-(I_3+I_4))/(I_1+I_2+I_3+I_4)$$

$$Y=((I_1+I_4)-(I_2+I_3))/(I_1+I_2+I_3+I_4)$$

In the Equations 1, Ii (i=1, 2, 3 or 4) represents signal current from the i-numbered probe.

After the beam deviation has been calculated, a signal representing the deviation is fed-back to an insertion device, thereby making it possible to adjust the beam position.

The specification of the synchrotron radiation facility and insertion device in this example was as follows:

Electron beam energy: 6.5 GeV

Electron beam current: 50 mA

Insertion device: Undulator

Maximum flux density: About $1 \times 10^{16}$ photons/s $mrad^2$ 0.1% b.w.

It was possible to control the beam position at quite high speed by feeding outputs back to the undulator from the monitor.

In addition, since most of the X-ray beam passes through the through hole of the diamond plate, the beam was only slightly attenuated even after passage of the beam through the diamond plate. Furthermore, scattering of the beam downstream of the monitor was not found. The detection sensitivity and position controllability of beam position remained unchanged even after 3 weeks use. In addition, the diamond plate and metal electrodes were observed after the test. Damage to the monitor by the irradiation of the beam could not be found.

[Reference 2]

A conventional blade type monitor 48 with the tungsten (W) blade, a cross-section of which is illustrated in FIGS. 17A and 17B, was tested for comparison on the same conditions as the example 2. Results obtained showed that example 5 shows better performance than conventional blade type monitor in terms of sensitivity, accuracy for monitoring position, and monitoring speed.

As having been described, the present invention provides a X-ray beam position monitor at low costs, which is superior in heat-resistance and radiation-resistance, has high sensitivity, and operates at high speed. Furthermore, a diamond plate having a plurality of electrode pairs can be used as a X-ray beam position monitor by placing perpendicularly to X-ray beam.

Furthermore, the monitor can have higher sensitivity since electron-hole pairs are generated through entire diamond unlike other semiconductor detectors which generate electron-hole pairs only in a depletion layer in the p-n junction. In addition, the generated carriers have large mobility, and hence the monitor can operate at higher speed. Furthermore, the monitor has good heat-resistance and radiation-resistance, and thermal load caused by X-ray beams can be decreased due to the use of diamond.

It should be noted that the subject matter of the present invention is not to be limited to the above mentioned embodiments. For instance, the present invention may be used for monitoring other X-rays such as high-powered laser like $CO_2$ gas laser and excimer laser and other radiation beam like ion, electron, γ-rays so on.

The X-ray beam position monitor provides advantages such as (a) providing high accuracy for monitoring position of X-ray beams, (b) withstanding high-power radiation beams for a long time, namely, having radiation-resistance and heat resistance, (c) providing quick response, (d) being unlikely to be influenced by background from bending magnets, (e) having less radiation beam loss and scattering, namely, having high transmission of the beam, and thereby able to monitor beam position while using radiation for experiments (on-line monitoring), (f) being easy in maintenance and capable of being placed in a high vacuum.

In addition, the monitor is superior in heat-resistance and radiation-resistance and provides quick response and high sensitivity, and in addition, can be relatively easily manufactured at low costs. Furthermore, installation in a beam line, adjustment and repair are all easily accomplished. By using polycrystal diamond made by vapor phase synthesis, it is possible to further decrease fabrication costs.

A X-ray beam position monitor made in accordance with the invention can be used in combination of windows utilizing high thermal conductivity, heat-resistance and radiation-resistance of diamond. In addition, the monitor may be used to monitor the other radiation beams like ion, electron, γ-rays so on.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An X-ray beam position monitor, comprising:

a diamond plate having two sides and being positionable in the path of an X-ray beam, a plurality of electrode pairs, symmetrically-disposed on the diamond plate, each pair comprising electrodes placed on opposite sides of said diamond plate, a DC current source operably connected to apply a voltage between the electrodes of the electrode pairs, a current measuring apparatus operably connected to measure a current flowing between said the electrodes of the electrode pairs, and a processor arranged to receive the current measured by the current measuring apparatus, and calculate a position of said X-ray beam using the current.

2. The monitor as set forth in claim 1, wherein said electrode pairs are arranged symmetrically with one another on the said diamond plate about an intersection of said X-ray beam.

3. The monitor as set forth in claim 1 further comprising an arithmetic processing system for enumerating a position of said X-ray beam on the basis of said current measured by said current measuring apparatus.

4. The monitor as set forth in claim 1 further comprising a cooling mechanism for said diamond plate.

5. The monitor as set forth in claim 4 further comprising a feed-back system for carrying out feed-back control of a position of said X-ray beam on the basis of a beam position enumerated by said arithmetic processing system.

6. The monitor as set forth in claim 1, consisting of a single diamond plate.

7. The monitor as set forth in claim 1, comprising of a plurality of flat plates.

8. The monitor as set forth in claim 1, wherein said diamond plate is fabricated by vapor phase synthesis.

9. The monitor as set forth in claim 1, wherein said diamond plate is composed of single crystal diamond or polycrystal diamond.

10. The monitor as set forth in claim 1, wherein said diamond plate has resistivity equal to or greater than $10^7$ $\Omega$.cm.

11. The monitor as set forth in claim 1, wherein said diamond plate has a through hole in the center.

12. The monitor as set forth in claim 1, wherein said diamond plate has a thinner thickness portion in the center.

13. The monitor as set forth in claim 1, wherein said diamond plate has a diamond layer having lower resistivity.

14. The monitor as set forth in claim 13, wherein said diamond layer has resistivity ranging from $10^{-3}$ to $10^2$ $\Omega$.cm.

15. The monitor as set forth in claim 13, wherein said diamond layer having lower resistivity is a layer into which boron (B) is doped.

16. The monitor as set forth in claim 15, wherein said diamond layer having lower resistivity is a layer into which boron (B) is doped at a dose of $10^{16}$/cm$^3$.

17. An X-ray beam position monitor, comprising:

a diamond plate having two sides and having a thin diamond film, and a boron doped diamond layer having a resistivity in the range of $10^{-3}$ to $10^2$ $\Omega$.cm, the diamond plate being positionable in the path of an X-ray beam, and a plurality of electrode pairs, each pair comprising electrodes placed on opposite sides of said diamond plate.

18. A monitor according to claim 17, wherein said boron doped diamond layer is doped at a dose of $10^{16}$/cm$^3$.

* * * * *

UNITED STATES PATENT AND TRADEMARK OFFICE
CERTIFICATE OF CORRECTION

PATENT NO. : 5,717,214
DATED : Feb. 10, 1998
INVENTOR(S) : Hideo KITAMURA, et al.

It is certified that error appears in the above-identified patent and that said Letters Patent is hereby corrected as shown below:

On the title (front) page of the patent, at section [73], after "Wako, Japan", insert the following:

--; SUMITOMO ELECTRIC INDUSTRIES LTD., OSAKA, JAPAN; and ISHIKAWAJIMA-HARIMA HEAVY INDUSTRIES CO., LTD., TOKYO, JAPAN--

Signed and Sealed this

Thirtieth Day of June, 1998

Attest:

BRUCE LEHMAN

*Attesting Officer*      *Commissioner of Patents and Trademarks*